(12) United States Patent
O'Donnell et al.

(10) Patent No.: US 12,518,247 B2
(45) Date of Patent: Jan. 6, 2026

(54) SYSTEM AND METHOD OF TRANSLATING A TRACKING MODULE TO A UNIQUE IDENTIFIER

(71) Applicant: HUBSPOT, INC., Cambridge, MA (US)

(72) Inventors: Sean O'Donnell, Dublin (IE); Prabodh Kant Singh, Uttar Pradesh (IN); Gianluca Messinese, Berlin (DE); Nnamdi Ibeanusi, Ontario (CA); Jared Williams, Cambridge, MA (US)

(73) Assignee: HUBSPOT, INC., Cambridge, MA (US)

( * ) Notice: Subject to any disclaimer, the term of this patent is extended or adjusted under 35 U.S.C. 154(b) by 269 days.

(21) Appl. No.: 18/196,672

(22) Filed: May 12, 2023

(65) Prior Publication Data

US 2023/0368135 A1  Nov. 16, 2023

Related U.S. Application Data

(60) Provisional application No. 63/341,646, filed on May 13, 2022.

(51) Int. Cl.
*G06Q 10/10* (2023.01)
*G06Q 30/0201* (2023.01)

(52) U.S. Cl.
CPC ......... *G06Q 10/10* (2013.01); *G06Q 30/0201* (2013.01)

(58) Field of Classification Search
CPC .......................... G06Q 10/10; G06Q 30/0201
See application file for complete search history.

(56) References Cited

U.S. PATENT DOCUMENTS

| | | | |
|---|---|---|---|
| 7,136,941 B2 | 11/2006 | Nguyen et al. |
| 7,580,982 B2 | 8/2009 | Owen et al. |
| 7,584,114 B2 | 9/2009 | Estrada et al. |
| 7,792,835 B2 | 9/2010 | Bohannon et al. |
| 7,831,676 B1 | 11/2010 | Nagar |
| 7,984,297 B2 | 7/2011 | Bohannon et al. |

(Continued)

FOREIGN PATENT DOCUMENTS

EP    1662380 A2 *   5/2006  ........... G06F 9/4493

OTHER PUBLICATIONS

M. R. Felipe, K. M. Mi Aung, X. Ye and W. Yonggang, "StealthyCRM: A Secure Cloud CRM System Application that Supports Fully Homomorphic Database Encryption," 2015 International Conference on Cloud Computing Research and Innovation (ICCCRI), Singapore, 2015, pp. 97-105 (Year: 2015).*

*Primary Examiner* — Sarah M Monfeldt
*Assistant Examiner* — Karma A El-Chanti
(74) *Attorney, Agent, or Firm* — Cooper Legal Group, LLC

(57) ABSTRACT

Techniques are provided for translating a tracking module to a unique identifier and provide for a registration system used to improve the functioning of computer systems, information networks, data stores, search engine systems and methods, and other advantages. The techniques provide for generating an urchin tracking module (UTM) from a globally unique identifier (GUID) and/or for translating the urchin tracking module (UTM) to a globally unique identifier (GUID). The techniques relate to registration systems and processes for using registration definitions in a customer relationship management (CRM)-powered application.

20 Claims, 16 Drawing Sheets

(56) References Cited

U.S. PATENT DOCUMENTS

| | | |
|---|---|---|
| 7,992,145 B2 | 8/2011 | Emerson et al. |
| 8,006,261 B1 | 8/2011 | Haberman et al. |
| 8,224,902 B1 | 7/2012 | Glasser et al. |
| 8,442,969 B2 | 5/2013 | Gross |
| 8,594,618 B2 | 11/2013 | Meyer et al. |
| 8,706,800 B1 | 4/2014 | Ahmed et al. |
| 8,719,356 B2 | 5/2014 | Dillingham et al. |
| 9,304,862 B2 | 4/2016 | Simon et al. |
| 9,305,104 B2 | 4/2016 | Wu et al. |
| 9,317,816 B2 | 4/2016 | Zeng et al. |
| 9,356,947 B2 | 5/2016 | Shraim et al. |
| 9,665,885 B1* | 5/2017 | Allouche .......... G06Q 30/0243 |
| 10,115,060 B2 | 10/2018 | Chestnut et al. |
| 10,217,058 B2 | 2/2019 | Gamon et al. |
| 10,387,559 B1 | 8/2019 | Wendt et al. |
| 10,853,082 B1 | 12/2020 | Aleti et al. |
| 10,992,780 B1 | 4/2021 | Rudrappa Goniwada et al. |
| 10,999,416 B1* | 5/2021 | Verma .................. H04L 67/535 |
| 11,379,870 B1* | 7/2022 | Hewitt, Jr. ............. G06F 9/451 |
| 12,014,395 B1* | 6/2024 | Kaiser ................ G06Q 30/0253 |
| 2002/0099697 A1 | 7/2002 | Jensen-Grey |
| 2002/0152254 A1 | 10/2002 | Teng |
| 2002/0199194 A1 | 12/2002 | Ali |
| 2003/0097617 A1 | 5/2003 | Goeller et al. |
| 2003/0208472 A1 | 11/2003 | Pham |
| 2004/0034652 A1 | 2/2004 | Hofmann |
| 2004/0111327 A1 | 6/2004 | Kidd |
| 2004/0122803 A1 | 6/2004 | Dom et al. |
| 2004/0260621 A1 | 12/2004 | Foster |
| 2005/0160166 A1 | 7/2005 | Kraenzel |
| 2005/0188028 A1 | 8/2005 | Brown et al. |
| 2005/0210111 A1 | 9/2005 | Fukudome |
| 2005/0265319 A1 | 12/2005 | Clegg et al. |
| 2006/0059033 A1* | 3/2006 | Wagner .................. G06Q 30/02 705/7.29 |
| 2006/0095556 A1 | 5/2006 | Arnold et al. |
| 2006/0212931 A1 | 9/2006 | Shull et al. |
| 2006/0224673 A1 | 10/2006 | Stern et al. |
| 2006/0242140 A1 | 10/2006 | Wnek |
| 2007/0011073 A1 | 1/2007 | Gardner et al. |
| 2007/0094271 A1* | 4/2007 | Juschkova .............. G06Q 30/02 |
| 2007/0136430 A1 | 6/2007 | Qureshi et al. |
| 2007/0203996 A1 | 8/2007 | Davitz et al. |
| 2007/0299777 A1 | 12/2007 | Shraim et al. |
| 2008/0034432 A1 | 2/2008 | Bohannon et al. |
| 2008/0168269 A1 | 7/2008 | Wilson |
| 2008/0172606 A1 | 7/2008 | White |
| 2009/0013041 A1 | 1/2009 | Farmer et al. |
| 2009/0019003 A1 | 1/2009 | Bohannon et al. |
| 2009/0119268 A1 | 5/2009 | Bandaru et al. |
| 2009/0138711 A1 | 5/2009 | Heimbigner |
| 2009/0248813 A1 | 10/2009 | Sawhney |
| 2010/0161506 A1 | 6/2010 | Bosenick et al. |
| 2010/0161735 A1 | 6/2010 | Sharma |
| 2010/0186088 A1 | 7/2010 | Banerjee et al. |
| 2010/0228777 A1 | 9/2010 | Imig et al. |
| 2010/0235915 A1 | 9/2010 | Memon et al. |
| 2010/0312837 A1 | 12/2010 | Bodapati et al. |
| 2011/0029504 A1 | 2/2011 | King et al. |
| 2011/0149725 A1 | 6/2011 | Zhao et al. |
| 2011/0179067 A1 | 7/2011 | Dalvi et al. |
| 2011/0246287 A1* | 10/2011 | Wright .................. G06Q 30/00 705/14.45 |
| 2011/0258218 A1 | 10/2011 | Hayes et al. |
| 2011/0307295 A1* | 12/2011 | Steiert .................... G06Q 10/06 705/7.29 |
| 2012/0053887 A1 | 3/2012 | Nurmi |
| 2012/0191546 A1 | 7/2012 | Phelan et al. |
| 2012/0197862 A1 | 8/2012 | Woytowitz et al. |
| 2012/0198056 A1 | 8/2012 | Shama et al. |
| 2012/0316904 A1 | 12/2012 | Eder |
| 2013/0007627 A1 | 1/2013 | Monaco |
| 2013/0047034 A1 | 2/2013 | Salomon et al. |
| 2013/0054622 A1 | 2/2013 | Karmarkar et al. |
| 2013/0073336 A1 | 3/2013 | Heath |
| 2013/0138555 A1 | 5/2013 | Shishkov |
| 2013/0238715 A1 | 9/2013 | Sanyal et al. |
| 2013/0339456 A1 | 12/2013 | Nikolayev et al. |
| 2014/0006139 A1 | 1/2014 | Aggarwal et al. |
| 2014/0025683 A1 | 1/2014 | Howland et al. |
| 2014/0025763 A1 | 1/2014 | Furlong et al. |
| 2014/0105508 A1 | 4/2014 | Arora |
| 2014/0108309 A1 | 4/2014 | Frank et al. |
| 2014/0156681 A1 | 6/2014 | Lee et al. |
| 2014/0214974 A1 | 7/2014 | Kurzanski et al. |
| 2014/0236663 A1 | 8/2014 | Smith |
| 2014/0258169 A1 | 9/2014 | Wong et al. |
| 2014/0279622 A1 | 9/2014 | Bharadwaj et al. |
| 2014/0280453 A1 | 9/2014 | Mattison et al. |
| 2014/0328172 A1 | 11/2014 | Kumar et al. |
| 2014/0372363 A1 | 12/2014 | Chestnut et al. |
| 2014/0372566 A1 | 12/2014 | Milne et al. |
| 2015/0006647 A1 | 1/2015 | Steinberg et al. |
| 2015/0032826 A1 | 1/2015 | Gunaratnam |
| 2015/0032827 A1 | 1/2015 | Tyler et al. |
| 2015/0081611 A1 | 3/2015 | Shivakumar |
| 2015/0100896 A1 | 4/2015 | Shmarovoz et al. |
| 2015/0154664 A1 | 6/2015 | Mae |
| 2015/0170195 A1* | 6/2015 | Drew .................. G06Q 30/0242 705/14.41 |
| 2015/0188874 A1 | 7/2015 | Feinstein |
| 2015/0248490 A1 | 9/2015 | Myslinski |
| 2015/0278867 A1* | 10/2015 | Lerman ............... H04W 40/244 705/14.58 |
| 2015/0286357 A1 | 10/2015 | Penha et al. |
| 2015/0312187 A1 | 10/2015 | Menna et al. |
| 2015/0324469 A1 | 11/2015 | Keyngnaert et al. |
| 2015/0347924 A1 | 12/2015 | Zeng et al. |
| 2015/0379018 A1 | 12/2015 | Gur et al. |
| 2015/0381552 A1 | 12/2015 | Vijay et al. |
| 2016/0012364 A1 | 1/2016 | Filgueiras |
| 2016/0020917 A1 | 1/2016 | Tuatini et al. |
| 2016/0026720 A1 | 1/2016 | Lehrer et al. |
| 2016/0036750 A1 | 2/2016 | Yuan |
| 2016/0063560 A1 | 3/2016 | Hameed et al. |
| 2016/0078455 A1 | 3/2016 | O'Donnell et al. |
| 2016/0119260 A1 | 4/2016 | Ghafourifar et al. |
| 2016/0156858 A1 | 6/2016 | Lee et al. |
| 2016/0180248 A1 | 6/2016 | Regan |
| 2016/0226808 A1 | 8/2016 | Lin |
| 2016/0232540 A1 | 8/2016 | Gao et al. |
| 2016/0307191 A1 | 10/2016 | Turgeman et al. |
| 2016/0315969 A1 | 10/2016 | Goldstein |
| 2016/0359793 A1 | 12/2016 | Kraios |
| 2017/0005954 A1 | 1/2017 | Shaltiel et al. |
| 2017/0031894 A1 | 2/2017 | Bettersworth et al. |
| 2017/0068982 A1 | 3/2017 | Vangala et al. |
| 2017/0103439 A1 | 4/2017 | Kolb et al. |
| 2017/0103441 A1 | 4/2017 | Kolb et al. |
| 2017/0186042 A1 | 6/2017 | Wong et al. |
| 2017/0221089 A1 | 8/2017 | Zhu et al. |
| 2017/0264577 A1 | 9/2017 | Ganin et al. |
| 2017/0289287 A1 | 10/2017 | Modi et al. |
| 2017/0317962 A1 | 11/2017 | Chen |
| 2017/0337569 A1 | 11/2017 | Sasson |
| 2017/0353410 A1 | 12/2017 | Gonzales |
| 2018/0039696 A1 | 2/2018 | Zhai et al. |
| 2018/0097759 A1 | 4/2018 | Brechbuhl et al. |
| 2018/0097828 A1 | 4/2018 | Coskun |
| 2018/0121986 A1 | 5/2018 | Akkiraju et al. |
| 2018/0336495 A1 | 11/2018 | Chestnut et al. |
| 2019/0251593 A1* | 8/2019 | Allouche .......... G06Q 10/0639 |
| 2019/0266631 A1* | 8/2019 | Neuenschwander ....................... H04L 63/0428 |
| 2020/0067861 A1 | 2/2020 | Leddy et al. |
| 2020/0143431 A1* | 5/2020 | Douglas .................. H04L 67/53 |
| 2020/0153771 A1* | 5/2020 | Thies ...................... H04L 51/08 |
| 2020/0311772 A1* | 10/2020 | Allen .................. G06Q 30/0246 |
| 2021/0073843 A1* | 3/2021 | Shepherd ........... G06Q 30/0212 |
| 2021/0150587 A1* | 5/2021 | Rizvi .................. G06Q 30/0267 |
| 2021/0182255 A1* | 6/2021 | Hersans ............... G06F 16/2468 |
| 2021/0334206 A1* | 10/2021 | Colgrove ................ G06F 3/067 |

(56) References Cited

U.S. PATENT DOCUMENTS

2022/0368593 A1* 11/2022 Shankar .............. H04L 41/0893
2022/0374546 A1* 11/2022 Wang .................... G06Q 30/08

* cited by examiner

| VERSION | ENCRYPTED DATA (GUID PLUS VERSION) |
|---|---|
| 1 | +9sXBkwpkljzQYwOHpRdw== |
| 2 | 7sQO5Arq1+YPGVXdOjHMnA== |
| 3 | mo0iwPraVOnN5lcQoscgUQ== |
| 4 | NOjiktesNjAavCjfpds2g== |

| Calendar Function Attribute: | Corresponding Object Attribute |
|---|---|
| "crmObjectTypeId" : | "MARKETING_EMAIL", |
| "crmObjectDisplayName" : | "email", |
| "objectIdProperty" : | "hs_origin_asset_id", |
| "startDateProperty" : | "hs_publish_date", |
| "titleProperty" : | "hs_name", |
| "scopes" : [ | |
| "EMAIL_CORE_API_ACCESS" | |
| ], | |
| "gateName" : | null, |
| "categoryProperty" : | null, |
| "categoryPropertyOptions" : | [ ], |
| "publishStatusProperty" : | "hs_state", |
| "descriptionProperty" : | null, |
| "campaignGuidProperty" : | "hs_campaign_name", |
| "detailsUrlProperty" : | null, |
| "previewProperty" : | "hs_preview_key", |
| "previewType" : | "KEY", |
| "createdByProperty" : | null, |
| "hs_marketing_email_created_by_id" : | |
| "assigneeIdProperty" : | null, |
| "recurringScheduleProperty" : | null, |
| "endDateProperty" : | null, |
| "atMentionedOwnerIds" : | null, |

| Calendar Function Attribute: | Corresponding Object Attribute |
|---|---|
| "propertiesFilters" : { | |
| "hs_state" : [ | |
| "PUBLISHED", | |
| "SCHEDULED_OR_PUBLISHED", | |
| "PRE_PROCESSING", | |
| "PUBLISHED_AB", | |
| "PUBLISHED_AB_VARIANT", | |
| "PROCESSING", | |
| "SCHEDULED_AB", | |
| "AUTOMATED", | |
| "PUBLISHED_OR_SCHEDULED", | |
| "AUTOMATED_SENDING", | |
| "AUTOMATED_FOR_FORM_LEGACY", | |
| "SCHEDULED" | |
| ] | |
| }, | |
| "iconName" : | "email", |
| "isEnabled" : | true, |
| "isEmptyStringWhenNoCampaignGuidIsAssigned" : | false, |
| "isHsCoreCalendar" : | true |

*FIG. 10*

SYSTEM AND METHOD OF TRANSLATING A TRACKING MODULE TO A UNIQUE IDENTIFIER

This application claims priority to U.S. Provisional Patent Application, titled "SYSTEM AND METHOD OF TRANSLATING A TRACKING MODULE TO A UNIQUE IDENTIFIER", filed on May 13, 2022 and accorded Application No.: 63/341,646, which is incorporated herein by reference.

BACKGROUND

Conventional systems for enabling marketing and sales activities for a business user do not also respectively enable support and service interactions with customers. While marketing activities, sales activities, and service activities strongly influence the success of each other, businesses are required to undertake complex and time-consuming tasks to obtain relevant information for one activity from the others, such as forming queries, using complicated APIs, or otherwise extracting data from separate databases, networks, or other information technology systems (some on premises and others in the cloud), transforming data from one native format to another suitable form for use in a different computing environment, synchronizing different data sources when changes are made in different databases, normalizing data, cleansing data, and configuring it for use.

A customer relationship management (CRM) system provides the ability to manage and analyze interactions with customers. The CRM system may electronically compile data from various communication channels (e.g., email, phone, chat, content materials, social media, etc.). Some CRM systems can be used to monitor and track CRM standard objects. These CRM standard objects can include typical business objects such as accounts (e.g., accounts of customers), contacts (e.g., persons associated with accounts), leads (e.g., prospective customers), and opportunities (e.g., sales or pending deals)

SUMMARY

In some embodiments, a method is provided. The method includes assigning a globally unique identifier to a customer relationship management object within a CRM database. The method includes saving a generated campaign name as an entry in an array within the customer relationship management object, wherein the generated campaign name is used to refer to a campaign. The method includes creating encrypted information comprising an encryption of the globally unique identifier and a value of the entry storing the generated campaign name. The method includes creating concatenated information comprising the generated campaign name concatenated with the encrypted information. The method includes utilizing the concatenated information to track the campaign using an urchin tracking module, wherein the campaign is used to selectively display electronic content on client devices.

In some embodiments, the method includes generating the globally unique identifier using a random number generator configured to generate non-identical globally unique identifiers over a set of globally unique identifiers.

In some embodiments, the electronic content is provided to users and describes a good or service provided by a customer of a multi-service business platform that includes the CRM database. The urchin tracking module is used to track interactions of the users with the electronic content for providing insight to the customer of user interest with the good or service.

In some embodiments, the method includes adding an auto-indexed entry as the entry into the array, wherein the auto-indexed entry corresponds to a position of the generated campaign name within the array.

In some embodiments, the concatenated information comprises a concatenated generated campaign name and the encryption information. The method includes assigning the concatenated generated campaign name and the encryption information to an urchin tracking module attribute of the campaign tracking module.

In some embodiments, the method includes receiving a uniform resource locator (URL) with an urchin tracking module attribute that is used to create the generated campaign name.

In some embodiments, the method includes receiving a uniform resource locator (URL) with urchin tracking module attributes used to obtain an attribute value for generating an encrypted object id-version as the encryption information.

In some embodiments, the method includes decrypting the encrypted information to obtain the globally unique identifier and the value of the entry storing the generated campaign name.

In some embodiments, the method includes validating the encrypted information based upon a cross-reference indexed by the value of the entry storing the generated campaign name.

In some embodiments, the method includes utilizing the globally unique identifier to securely retrieve an object from a customer relationship management database.

In some embodiments, the method includes utilizing a version specific generated campaign name from an object retrieved from a customer relationship management database using the globally unique identifier by applying a version value as an index into a name array of the object.

In some embodiments, a method is provided. The method includes retrieving a registration definition element instance from a registration patterns data structure comprising a set of registration definition element instances associated with types of objects stored within a database, wherein the registration definition element instance is associated with a type of object. The method includes accessing an object occurrence of the type of object from the database. The method includes adapting a value of a property in the object occurrence to create an adapted value based upon a mapping of the property to a content item in a customer relationship management (CRM)-powered application, wherein the mapping is described in the registration definition element instance. The method includes providing the adapted value to the CRM-powered application as the content item.

In some embodiments, the method includes identifying the registration definition element instance based upon a correspondence of an application identifier in the registration patterns data structure corresponding to an identifier of the CRM-powered application.

In some embodiments, the CRM-powered application is a calendar application that depicts items in a calendar-based user interface based upon data information within the content item.

In some embodiments, the object occurrence corresponds to an event and the property corresponds to a date of the event.

In some embodiments, the method includes mapping a date of an event to the content item to trigger a calendar application to depict the event on the date of the event, wherein the event corresponds to the object occurrence and the date of the event corresponds to the property.

In some embodiments, a method is provided. The method includes monitoring a stream of customer relationship management (CRM) database change activity that includes change events identifying object types and property changes. The method includes matching an object type in a change event to a list of registration associations that includes registration association element instances identifying target object types and monitored properties. The method includes identifying a correspondence of the object type in the change event to a target object type and a correspondence of a property change in the change event to a monitored property. The method includes propagating the property change to a corresponding property of another object of the target object type stored in the CRM database.

In some embodiments, the method includes propagating the property change based upon an association cardinality property of a registration association element instance.

In some embodiments, a one-to-many cardinality property value of an association cardinality property of a registration association element instance results in the propagating adding a value that is identified in the property change of the change event to the corresponding property.

In some embodiments, a one-to-one cardinality property value of an association cardinality property of a registration association element instance results in the propagating replacing an existing value in the corresponding property with a value that is identified in the property change of the change event.

BRIEF DESCRIPTION OF THE FIGURES

FIG. 8 depicts a table of encrypted data for verification of a UTM, according to one or more embodiments of the disclosure.

FIG. 10 provides an example of a registration definition element instance for rendering an asset with a calendar system, according to one or more embodiments of the disclosure.

DETAILED DESCRIPTION

Intro/Overview of Tracking Model

Figure 1:
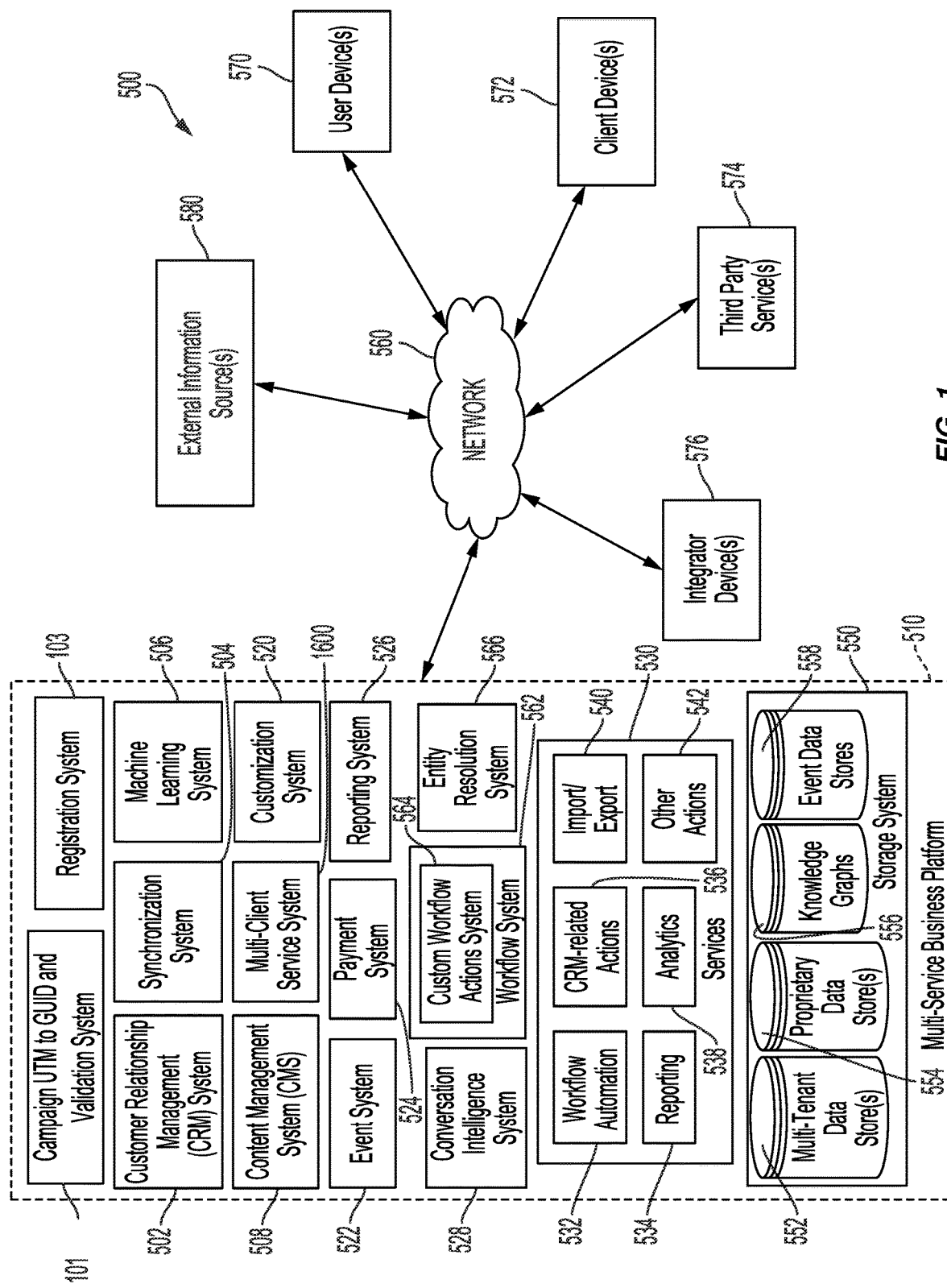
FIG. 1 is an example environment view of a multi-service business platform communicating with various systems, devices, and data sources having a urchin tracking module (UTM) to GUID and validation system, according to one or more embodiments of the disclosure.

Systems and processes are provided herein for translating between urchin tracking module (UTM) content (e.g., content used in a uniform resource locator (URL) of a campaign) and a globally unique identifier (GUID) that may be used to uniquely identify a database object, such as a database object for the campaign.

Background of UTM and GUID

In some embodiments, an urchin tracking module (UTM) to globally unique identifier (GUID) and validation system may embody systems and/or processes that may tie to a multi-service business platform framework, thereby allowing services of the campaign UTM to GUID and validation system to access campaign data that may be integrated into the platform framework (e.g., centralized data framework, distributed data framework, etc.).

In some embodiments, a central facet for an exemplary marketing hub product may include being able to report on effectiveness of a campaign (e.g., a marketing campaign). In some embodiments, assigning a universal ID to each campaign may facilitate integral workings of such a product. This may allow for reporting on any or all aspects of the campaign and tying customer business activity back to that campaign (e.g., tying a customer's journey through various business activities back to a campaign may provide a holistic overview of how a business cycle is actually functioning).

Further, aspects of a campaign UTM to GUID and validation system may be different and unique by having access to an entire office suite of activities and then being able to map that out from a marketing campaign.

Compared to existing UTM solutions, these systems and/or processes may be based on a combination of converting a UTM to a GUID and then using the GUID to connect to the multi-service business platform in a universal object access framework.

Business enterprises, individuals, etc. may employ digital marketing campaigns for, among other things, promotional purposes, such as to achieve awareness of a new product or service. Tracking activity and results of these digital marketing campaigns may rely on a mechanism of passing information among computing instances/systems via an Internet Protocol, such as a universal record locator (e.g., URL). In particular, a mechanism referred to as UTM, which is known to stand for Tracking Module may provide valuable information to digital marketing campaigns. A UTM, which may be passed as a set of parameterized fields in a URL, may include an identifier for a corresponding digital marketing campaign. In some embodiments, an identifier for a digital marketing campaign may be represented in a UTM as a value of a "CTM_campaign" field. When the "CTM_campaign" field, herein referred to as the campaign name may be unique for a given digital campaign tracking framework, all activity associated with URLs containing a corresponding UTM may be tracked and attributed to the corresponding digital marketing campaign.

Digital marketing campaigns may include a range of digital assets, such as advertisements, posts (e.g., blog posts, social media posts), emails, webpages, workflows, etc. A digital marketing framework may handle these assets through a structured database, such as a customer relationship management (CRM) database that may be configured to relate this range of assets to a campaign based on, for example, the unique campaign name. When the amount of data handled by such a framework is small, a unified database may suffice for economical operation. However, the amount of data (e.g., the number of campaigns, number of assets, number of distinct clients with campaigns, etc.) may far exceed capabilities for even a database distributed over a few data servers. Therefore, campaign databases, and without limitation CRM databases used for handling such campaigns may be distributed over dozens if not hundreds or more of servers across the Internet. Further, as the number of campaigns and the number of clients executing campaigns handled by a distributed CRM database increase, it may become likely that two or more campaigns may be assigned the same human readable name. Resolving a UTM with a campaign name that is not uniquely distinguishable for a given distributed CRM database (or the like) may require significant computing resources (and more importantly excessive time) that may compromise the campaign and/or result in failure.

In some examples, even without a campaign name collision, determining a location of content (e.g., a database object instance of a campaign) for a particular UTM in a large distributed database may involve undue overhead in terms of computing resources (e.g., maintaining and accessing cross references of campaign-location with a human assigned campaign name across many servers for each occurrence of a UTM in an advertising campaign), excessive time (delays due to processing a URL may result in user dissatisfaction), as well as impacting handling common occurrences, such as a change to a human-assigned campaign name (e.g., updating such cross reference resources throughout the distributed database and maintaining a history of object instances of prior campaign names and related data).

In some embodiments, large distributed databases, among other types of record keeping systems, may benefit from efficient assignment of a unique identifier to each item in such a database. In some embodiments, a unique identifier may be assigned to a set of records (e.g., a database object instance) for each campaign in the database. Various approaches for generating a statistically unique identifier are provided. In an example, one such approach may involve producing a long random number so that even if more than one billion such numbers are generated, a probability of a collision may be well below a collision threshold for use of the identifiers generated. An example of a statistically unique identifier may be referred to herein as, among other things a GUID, which may be an acronym for "Globally Unique Identification Data", "Globally Unique Identifier", unique object identifier, unique object ID, ID, etc. Further, a human assigned/generated campaign name may be abbreviated herein as HGCN.

Therefore, there may be a need for efficient methods and systems to ensure that each campaign name (e.g., a campaign name for a digital advertising framework; a campaign name used in a UTM) may be unique. Further there may be a need for unique campaign naming methods and systems that may enable users to define (and redefine) a human-readable name for each campaign without being artificially restricted to a subset of all possible names, such as only using names that may not already be in use by another customer in a multi-service business platform database. Also, there may be a need for efficient access to a corresponding portion of a distributed CRM database (e.g., a database object instance) when presented with a unique campaign name.

Defining UTMs, GUIDs, and Processes

In some embodiments, an Urchin tracking module (UTM) may be a global standard used by marketers to track effectiveness of marketing campaigns across different sources and media (e.g., identifying marketing campaign clicks and internet activity). A campaign UTM may be a standard way of linking a marketing campaign to a location of clicks (e.g., clicks came from a social network website or app).

A campaign UTM may be defined to facilitate linking user activity to the campaign. In some embodiments, clicking on content within a social network website may take a user to a company webpage. The corresponding URL on a browser's address bar may have a relatively long string of words, characters, numbers, symbols, etc. that may be tagged onto a link, so that when a browser arrives at the target website, it may obtain insights and/or analysis such as a click coming from the social network website or a click coming from promotional content, and these actions may be associated with a marketing campaign. A campaign UTM may be a standard way of expressing the notion that clicks came from the marketing campaign.

In some embodiments, a globally unique identifier (GUID) may be a randomly generated identifier with a relatively low probability of collision which may be commonly used as an identifier in distributed systems.

In some embodiments, described herein are systems and processes of a way to directly translate a campaign UTM into a GUID. For example, a GUID may be essentially a relatively long, random number that may be generated in a specific way. A valuable property of a GUID may be the ability to randomly generate the GUID. Even if a system generates billions of GUIDs, the probability of getting a collision may be extremely low. This means that GUIDs may be used by distributed systems, such as systems with a relatively large data set that may not easily fit on a single database server. To operate effectively, the data set may be split across one hundred or more servers. In some embodiments, the system may use each GUID as the unique ID for existing and new entries knowing that the system may likely not get a collision between two entries in the data set having the same GUID.

Distributed systems may be used for promotional campaigns by companies that have data sets that may be relatively large (e.g., the data set may not fit on one computer, may not fit on a local database, may not fit on one system, etc.). In some embodiments, accessing a distributed system with a UTM may require a two-step process: (i) the system checks the UTM and (ii) looks up and determines which object belongs in the data set for the UTM. In some embodiments, this may involve using a cross reference between a campaign identification portion of the UTM and an identifier of the corresponding object in the distributed data set. In some embodiments, the system may obtain the location of the resource (e.g., blog post) in the data set through the two step process, and then may use that resource to execute one or more activities that may be required in the campaign. Therefore, when translating a UTM to an object identifier/location, an extra data store query may be introduced to lookup the location. The methods and systems of UTM to GUID processing may be able to directly convert a UTM to an object location (e.g., GUID), which may allow for performance improvements in distributed systems. In some embodiments, a system to transform a UTM directly to a GUID may enable the system to query a correct data store or an intermediary system in between, and may provide faster access to data set assets even for systems with externally distributed databases.

Example UTM System and Process

Referring again to FIG. 1, a multi-service business platform 510 may further include an urchin tracking module (UTM) to globally unique identifier (GUID) and validation system 101 for enabling efficient and disambiguated access to a campaign object in a database, such as a customer relationship management (CRM) database based on an encrypted string in a UTM property of a uniform resource locator (URL). The multi-service business platform 510 may also include a registration system 103 of registration patterns that enable independence of applications that consume CRM object data from the underlying structures of those objects while further enabling efficiently maintaining consistency and updating of objects. The campaign UTM to GUID and validation system 101 and the registration system 103 may communicate with various systems, devices, and data sources of the multi-service business platform 510.

Figure 2:
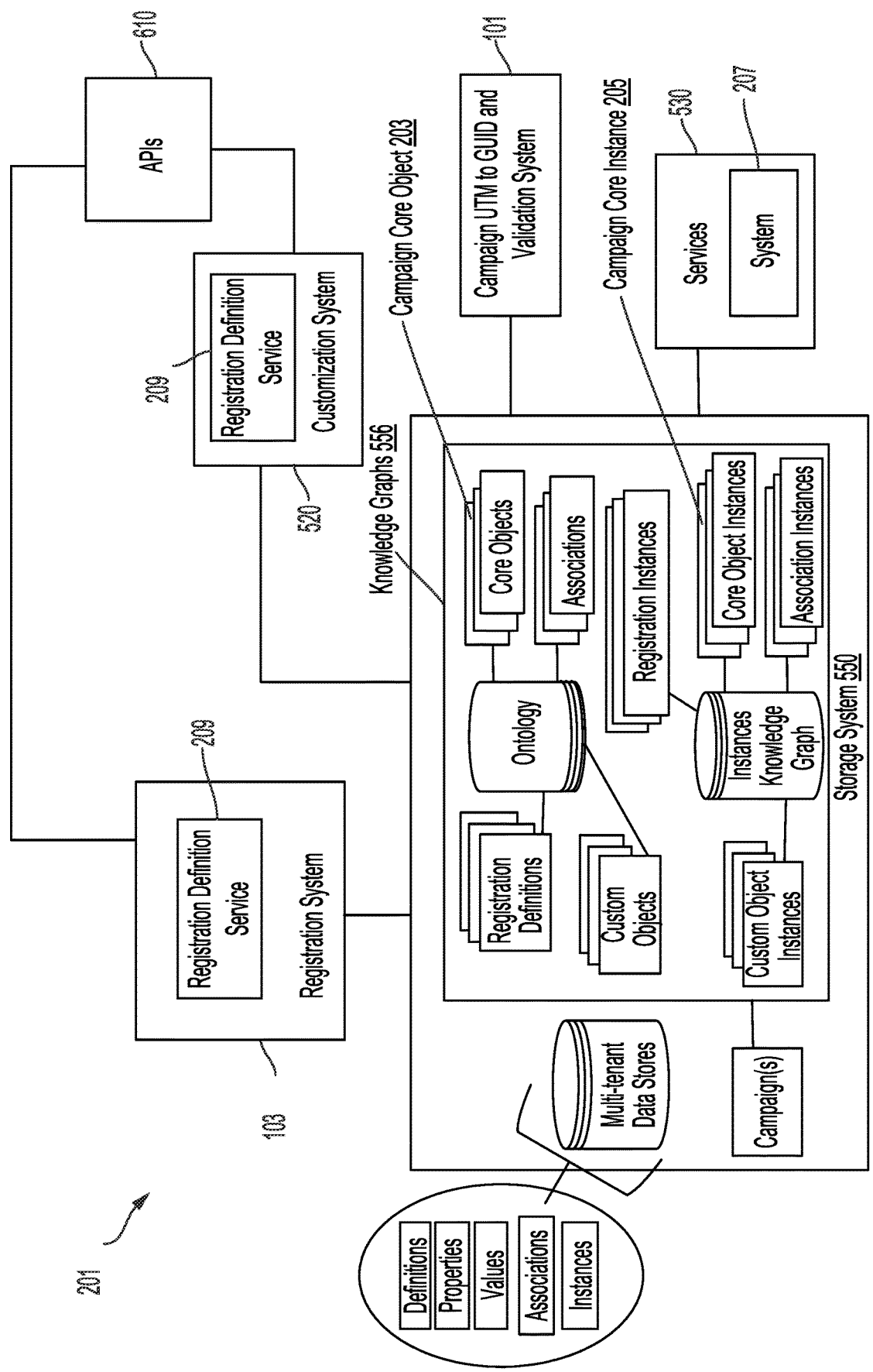
FIG. 2 is an example detailed view of portions of the multi-service business platform of FIG. 1 relating to the creation and use of registration objects by a registration system or registration definition system and use of a UTM to GUID and validation system of the multi-service business platform, according to one or more embodiments of the disclosure.

Referring to FIG. 2, a system 201 of the multi-service business platform 510 may include a registration system 103 (that may include a registration definition service 209) connected to a storage system 550 and to a customization system 520 (that may include a registration definition service 209) via a set of APIs 610. The registration system 103 (and registration definition service 209) may be used to create and use registration objects. The customization system 520 may include the registration definition service 209 for creating and/or generating registration objects. Further, similar to the organization of custom objects, an ontology may include registration objects and/or definitions and an instances knowledge graph that may include registration object instances. The storage system 550 of the multi-service business platform 510 may include a knowledge graph 556 that facilitates associating core objects (e.g., campaign core objects 203) and associations with registration definitions and custom objects via the ontology. The knowledge graph 556 may further facilitate associating core object instances 205 with association instances, custom object instances, and registration instances via the instances knowledge graph. Further, the system 201 may include a campaign UTM to GUID and validation system 101 that may be connected to the storage system 550. A set of services 530 that are associated with the storage system 550 may include a system service 207 (e.g., a calendar system service, an activity feed service, an asset association service, a campaign management service, etc.) that may rely on one or more output of the registration definition system 103. Campaigns of the storage system 550 may be associated with knowledge graph 556. The storage system 550 may include a set of multi-tenant data stores that may store several types of data including definitions, properties, values, associations, and instances. In some embodiments, the campaign UTM to GUID and validation system 101 and the system service 207 of services 530 as shown may be connected to the features and/or components of the storage system 550. Also, the campaign UTM to GUID and validation system 101, the registration system 103, and the registration definition service 209 may be connected to the system service 207 of the services 530 indirectly via the storage system 550.

In some embodiments, a UTM may include one or more attributes that facilitate identification of a corresponding campaign. A value for one of these attributes may be a name of the campaign. This campaign name, which may be a text string including words and spaces (e.g., "My campaign abc"), may be converted into a URL compatible string, such as by replacing spaces with value %20. In some embodiments, this conversion may be expressed as UTM=URL (name), where (name) may be the example campaign name "My campaign abc", etc.

In some embodiments, when a campaign name changes, the UTM for the renamed campaign may need to be changed. However, to ensure all named versions of the campaign may be maintained in the CRM, older versions of the UTM may need to be stored separately from, although linked to the changed name campaign. If a UTM of a campaign were to change, then use of the changed UTM may cause a complete break from the prior named campaign. If a campaign of the changed UTM did not exist, then this may break tracking of the UTM completely. In some examples, the UTM may have to be static and permanent which may be typical for most systems. Once it becomes a modifiable entity, most systems may break down and stop working. Functionality to change the UTM of a campaign, which was previously not supported by advertising campaign handling platforms, is provided herein.

In some embodiments, a process for generating UTMs that relies on constancy of a campaign name in a UTM may include taking a generated campaign name (e.g., a Human Generated Campaign Name (HGCN)), such as "My first campaign." For use in a URL the name may be converted (e.g., replacing spaces with a symbol) to result in a URL compatible string "My%20first%20campaign." From this URL compatible string a UTM may be created with a name attribute "&CTM_campaign=My%20first%20campaign."

With each renaming of this campaign, a new UTM may be generated by changing the UTM_campaign attribute. For example, through a sequence of renaming of a campaign with an object identifier (e.g., ID 36792613638), a corresponding "CTM_campaign" attribute value may be URL converted to the following: a) My%20first%20campaign, b)

My%20campaign, c) The%20campaign, d) The%20best%20campaign%20ever

In some embodiments, when utilizing a given CRM database for several clients, even though the campaign has been renamed, it may be difficult to create another campaign with any of the previous or current campaign names used for other clients in the CRM. Also, it may be difficult to distinguish between two campaigns with the same name. This may happen because, when the name of a campaign is used as the sole identifier of a campaign in a UTM, it may be unique across multiple versions in the CRM. In some embodiments, in a user interface through which a user may generate a new campaign name, a warning may pop up (e.g., "Couldn't create campaign" warning or "Campaign with this UTM already exists" warning). In some embodiments, a given CRM database may be used for several clients so that even though a campaign has been renamed, it may be difficult to create another campaign with an older name in the CRM.

Figure 3:
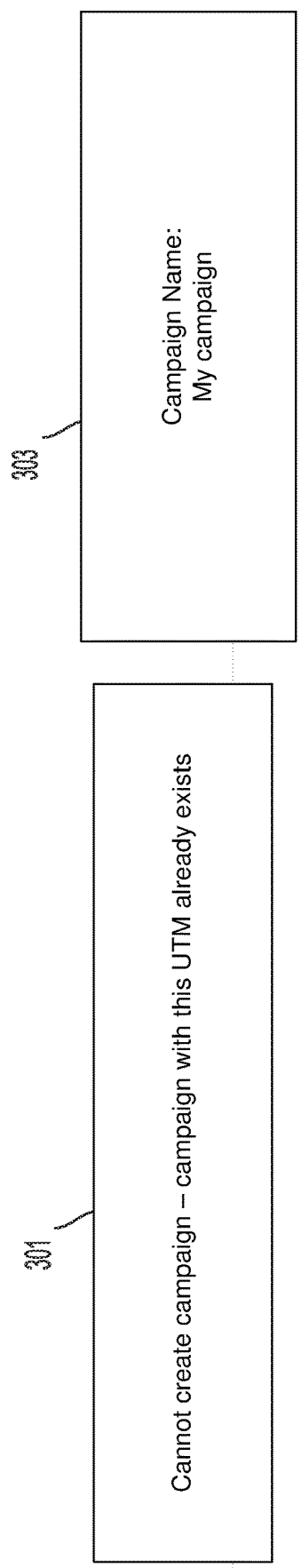
FIG. 3 is a screen shot of a user interface of the UTM to GUID and validation system depicting a duplicate campaign name error message, according to one or more embodiments of the disclosure.

Referring to FIG. 3 a portion of a user interface of the campaign UTM to GUID and validation system 101 may depict an error message that may be displayed when a user attempts to create a campaign (or rename an existing campaign) with a campaign name that may already exist in the CRM. In response to a user entering a campaign name in the required campaign name field 303, a campaign creation error 301 may be presented to the user.

New Improved UTM-GUID System

In some embodiments, the campaign UTM to GUID and validation system 101 may be used, even for a renamed a campaign, to reliably retrieve intended information from a campaign UTM. This may be achieved by making a UTM that has a campaign name value, which may be stored in a database (e.g., a CRM database), completely redundant, such as through use of another corresponding identifier in the UTM, such as the GUID for the object (e.g., object ID) in the CRM. This campaign UTM to GUID and validation system 101 may retrieve the intended information directly from the corresponding identifier value(s) (e.g., the GUID) which may be embedded in the UTM. While the UTM may be generated from the name of the campaign, the campaign UTM to GUID and validation systems and methods described herein may generate the UTM from the name as well as the object ID which may be optionally encrypted, and the version (e.g., a version of the campaign that corresponds to the campaign name) may be optionally encrypted. As will be described in greater detail, the object ID value and the version value may be combined and encrypted into a single encrypted string for use in a UTM.

In some embodiments, a generated campaign name may include a human generated campaign name or HGCN. Use of these terms may not require or imply that a human may physically generate (e.g., enter in a computer user interface) a name. Although user entry of an HGCN may be one example, the systems and processes herein of campaign UTM to GUID and validation may include any other form of generating and/or selecting a campaign name including being completely or partially computer automated. In some embodiments, a HGCN may be a familiar or conventional string of characters. However, any string of characters, whether they correspond to one of the examples herein or have no recognizable connection thereto may be used for the HGCN as described herein. As a further example, while a randomly generated HGCN may be used with the systems and processes provided herein.

In some embodiments, data for a UTM may include "human generated campaign name+<space>+multi-encrypted object ID+<space>+encrypted version." In other example embodiments, data for a UTM may include "Human generated campaign name+<space>+multi-encrypted [object ID+<space>+name version]". In some embodiments, name version may correspond to an index given to the campaign name by the system when a human generated campaign name is established/changed. A UTM text string for use in a URL may require conversion, such as URL conversion(data). For example embodiments in which the object ID and the version are combined and encrypted, this may result in a URL including: &CTM_campaign="campaign_name%20encrypt(36556484252 2)". For example embodiments in which the object ID and the version are encrypted separately, this may result in a URL including &CTM_campaign="campaign_name%20encrypt(36556484252)%20encrypt(2)", etc.

As an example, a UTM for a CRM object in the multi-service business framework may include a name attribute/property (e.g., campaign_name). In some embodiments, any property of a campaign object in the framework may have its own versions. In this example, the campaign may be only renamed once (e.g., notice the version of "2" at the end of the UTM_campaign string). However, if it was renamed five or six times, the CRM or the framework may store all six versions of the names. Each renamed version may be allocated a next sequential version number so that for a campaign that was originally named and then renamed five times, the version for the most recent name may be "6". The approach may upend the object ID (e.g., GUID that may uniquely identify this CRM object), then upend the information (e.g., encrypted object ID and version) along with the campaign name, and then may use it to generate the UTM. In this example, even if the name is changed, the system may be able to efficiently process a UTM to get or obtain the object ID and the version after decrypting the relevant portion of the UTM. In some embodiments, the system may directly fetch the name from the object that corresponds to the version in the UTM and may check if the name portion of the UTM is consistent with the name of that version taken from the object. If it is so, then the UTM may be a valid UTM. If not, then the UTM may not be the correct UTM for the corresponding CRM object.

A UTM with this compound UTM_campaign attribute value may relate to an object ID (e.g., ID specifically relating to custom objects interaction with the platform framework) in creating a "campaign object" for a data store. This allows users to create their own campaign objects that may be part of the core objects as shown in FIG. 2 (where core objects may include campaign objects and core object instances may include campaign object instances).

In some embodiments, systems and processes described herein may include combining human-generated campaign name data for a campaign with an identifier uniquely assigned to a (database-specific) object instance for the campaign. This combining may facilitate identifying a distributed database object instance of a campaign directly from a UTM. This combining may also facilitate generating a campaign name (e.g., for use in a "CTM_campaign" attribute of a UTM) that may be unique for a given human generated campaign name and may be common across versions of the underlying campaign independently of which set of human generated name(s) for the campaign may be used in a UTM. This combining may further provide benefits including more efficient processor utilization when handling all aspects of an advertising campaign associated with use of a UTM, etc.

One example of improved computing efficiency may include direct identification of an object instance in a CRM database from each UTM used in all campaigns being operated through the CRM database. Direct identification of an object may eliminate overhead such as determining a correspondence between a human assigned campaign name and a set of records (e.g., an object instance) in a database (e.g., via an intermediary system that performs a cross reference operation). This overhead, which may be common with some current UTM technology, may be eliminated. Another computing efficiency improvement may include a reduction in data storage and network bandwidth demand for common advertising campaign operations, such as renaming a campaign when a campaign operator may seek to track, among other things, performance differences that may be made to campaign parameters, etc. At least a portion of the efficiency improvement may be the reduction and/or elimination of maintaining separate object instances for each renaming of a campaign. Details of how these and other efficiencies are obtained by the methods and systems are described herein.

In some embodiments, when relying on a human-generated campaign name for uniquely tracking campaign activity and performance, renaming a campaign may involve, among other things, duplicating all campaign-specific assets in a campaign database to be accessed under the renamed campaign. Continuity of the campaign across names may be generally lost since there may not be an effective mechanism within a UTM for such multi-name tracking. Further, user interface systems through which campaign names may be generated (e.g., human-generated campaign names) may maintain an up-to-date list of campaign names and may prevent users from selecting a campaign name that may already be in use (e.g., even if it is in use by an unaffiliated third party user of such a multi-service business platform that may include an advertising campaign platform). Further, when multiple users are using such interface systems to generate campaign names, real-time name generation consistency may become a greater complication that may yield poor user experience in some examples.

The methods and systems described herein may use a combined human-generated campaign name (HGCN) with a random and unique identifier for a database object instance of the campaign to provide some advantages over other systems.

In some embodiments, advantages of the UTM-GUID processing methods and systems described herein may include a process for creating the GUID as distinct from a process of using the GUID with a campaign. This new process may allow for a "more direct" access to a campaign object in a CRM than existing UTM-based campaign systems that may generally require an intermediate look-up step (e.g., to convert the "CTM_campaign" UTM attribute into a database index). This new process may also allow for multiple uses of a single campaign name, which may be a human generated and generally human referenced name due in part at least to the incorporation of the GUID into the UTM—this may be important for a multi-tenant unaffiliated client common CRM database. Yet further this may allow for revision tracking of changes. Also, this may allow for continuity of campaign performance, while enabling distinction based on when a change may be made. As an example, when a campaign name is changed, data before and after the change may be identified and treated uniquely or as a single continuous campaign. Another advantage may include a benefit of using a GUID for a campaign object such that all related objects in a campaign may be identified through the GUID. Yet further advantages to an operator of a multi-service business platform may include use of only a portion of a UTM_campaign value to identify which campaign may be associated with the UTM. This may allow the operator to determine that two distinct UTM_campaign values may reference different versions of a single campaign. Third-party UTM monitoring software may use the entire UTM_campaign value and therefore may not determine that two differently named UTMs are for the same campaign.

Further, external tools may receive traffic with a UTM, and on that UTM may be the name. The UTMs of the UTM to GUID and validation system may have a changed shape compared to typical UTMs, at least due in part to the UTM attribute UTM_campaign having a non-human readable portion.

Another advantage may be in the use of a JavaScript Object Notation (JSON) array structure (e.g., for the "value" of the "hs_name" attribute), because the JSON array structure may implicitly assign an index to each entry in the array, thereby producing an automatic versioning system by using this index as the version of the encapsulating object and/or of the corresponding HGCN.

Yet another advantage may be a result of including both the human generated campaign name string and a corresponding object id and version (e.g., JSON object name array index) that operate as a validation security feature so that use of the human generated campaign name string and an incorrect encrypting of the object ID and version may be rejected (e.g., the CRM database may not be accessed).

In some embodiments, use of a GUID within a UTM may improve ability to implement changes across multiple aspects of the platform where there may be multiple systems that may have to be updated.

Some advantages of using a compound UTM name field may include directly accessing the campaign object in the distributed database from the UTM/URL because object IDs may be directly encrypted therein. Further, as described herein, access to the CRM may be enhanced because the system may compare the name in the UTM to name information in the corresponding object based on the version decrypted from the UTM (e.g., a validation form of security). Because the UTM may be dynamically generated from the CRM database, it may not need to be stored in the CRM in an encrypted or compound form (e.g., like a CRM object). As such, it may be a more inferred value than a value that may be stored.

In some embodiments, another advantage of the methods and systems for UTM to GUID processing may include the object ID allowing direct (e.g., lookup table free) access to the campaign source object in the CRM. This may allow faster database access to the object (e.g., Campaign object) in the CRM as the object ID in the UTM may be the unique identifier in the CRM. This core benefit of faster database access may also mitigate the potential name-change issues mentioned herein. This approach may be advantageous on several technical levels. For example, it may speed up and simplify many CRM operations.

Yet another benefit may include being able to validate a UTM through validation of the name of the campaign for a given version expressed in the UTM. CRM object properties may store versions. If this validation succeeds, the UTM may be considered valid.

In some embodiments, another advantage may be that the processes and systems may solve the problem of a UTM being unique across versions of a campaign, at least for versions of the name of the campaign (e.g., as the combination of object ID and version may be unique as object ID may be unique for each campaign).

Further, there may be other advantages provided. For example, these methods and systems may solve the need to store a UTM and associate all UTMs (for all names of a given campaign) to a single campaign. Additionally, it may improve a platform operator's ability to implement changes across multiple aspects of the platform (e.g., including multiple systems that may have to be updated). Yet again it mitigates name change issues, such as when a user may prefer to change a campaign name but continue to use the same campaign underlying object while maintaining continuity with all earlier names. Also, a compound UTM_campaign value as described herein may support external solutions to the problem of making this compound UTM value human readable to at least some extent. In some embodiments, a user interface process may be configured to render a parsed UTM.

The methods and systems of generation and use of a GUID with a UTM for a multi-service business platform may enable advanced advertising campaign control and tracking capabilities. In some embodiments, one substantive benefit of these methods and systems may be facilitating independence of processes to generate GUIDs and instantiate GUIDs for distributed database system management from use of these GUIDs as a mechanism for enriching use of UTM technology, particularly for a multi-service business platform comprising a multi-tenant database of unaffiliated clients. In some embodiments, the methods and systems herein that facilitate integrating use of a GUID with human campaign naming capabilities may further streamline computing processes for operating UTM-based advertising campaign. As an example, a campaign object in a relatively large, distributed object-based database may be directly accessed from a "CTM_campaign" attribute value in a UTM due at least in part to encrypting the unique identifier of a campaign object that corresponds to the UTM into this attribute value. Further, these methods and systems may enable independence of a campaign generation and operational framework from an organizational framework for a corresponding distributed database architecture. All that may be required to be shared between the frameworks may be a unique object identifier. Intermediate lookup/cross-reference operations and resources (e.g., a server dedicated to performing campaign name to distributed database object cross referencing) may be further reduced and/or eliminated through these methods and systems.

Further benefits enabled through the methods and systems herein may include allowing multiple uses of a human generated campaign name for different clients in a multi-tenant campaign management database. This may be supported at least in part by integrating the campaign management database object identifier (GUID) directly into a UTM context. Without this integration and use of the GUID at the UTM level, campaign naming may be substantively (and from a human user's perspective arbitrarily) restricted to avoid duplicate names. This may be particularly beneficial when multiple unaffiliated clients may be using the common UTM framework for advertising campaigns within a single campaign management database.

Yet further benefits include a degree of revision tracking of changes (e.g., changes to campaign name) of underlying campaigns. In addition to the benefits above, the methods and systems for integrating a GUID with UTM technology may include allowing for continuity of campaign performance tracking, while enabling electing between continuity or distinction as changes to a campaign (e.g., a campaign name) may be made. Continuity may permit a holistic view of a campaign from instantiation throughout the life of the campaign, even when changes to a campaign name may be made. Distinction may permit tracking how changes to a campaign (e.g., those made in coordination with a change in campaign name) may impact performance by permitting tracking and measuring performance for human generate campaign name-based instances of a campaign. These benefits may extend further by reducing computing/data storage resources as changes to the campaign name may be made. Not only may two campaign names be linked with no overhead, but as campaign name changes are made, campaign attribute values that are unique to the renamed campaign may need to be tracked. Campaign elements/attributes that remain constant across a campaign name change may be maintained directly in the CRM database due to the indexing nature of elements within a campaign object. Thus, there may be no need to copy an entirety of a campaign CRM content merely when the campaign name may be changed.

New Improved UTM-GUID Process

It may be instructive to explore and compare the current UTM process (HGCN-based only) to a new compound UTM campaign name process performed by the campaign UTM to GUID and validation system described herein.

In some examples, to create a UTM for a campaign, a system may take a name of the campaign. The name of the campaign may be converted (e.g., encrypted in some examples) in such a way that it may work in a hyperlink because there may be a set of allowed characters. This step of the process URL conversion may be called. In some embodiments, the UTM variable "CTM_campaign" may be a length-limited version (optionally encrypted) of the campaign name. Although CRM use rules may enforce that this human generated campaign name may be unique to the customer who generates it, it may not be unique across the entirety of CRM data for a multi-service business platform that may serve several customers. Therefore, two customers may have exactly the same UTM campaign name variable. Included in the UTM may be some non-human readable information that may be encrypted to allow readily determining of the object within the CRM without having to do an intermediary lookup.

An example of where such an approach may be helpful may include one in which a platform may have 10 million users but only 5 million may fit in a single instance of the platform database. One approach may be to place one half of the alphabet, based on a customer's name, on one server, and a second half on another server, making a lightly distributed database. The system may look at the name and determine which database to select. However, when the size of the database may require 20, 30, 40, or 50 database servers, trying to be well balanced such as a simple name-based allocation scheme may be difficult. In such examples, the system may use either an intermediary server that may have enough information to do the look up and determine which server to select to obtain the data, or the system may use a mathematical operation (e.g., a random hash) to determine the server. In some examples, a distributed system in which no one server stores all the data may include an operation in the middle to determine how to get to a final storage location/server.

In some embodiments, using a unique ID (e.g., GUID) for each object in the CRM in the multi-service business framework, each object may be found through its ID. The multi-service business platform may have access to and/or may provide multiple APIs to do this. For example, to find a specific object given its ID, the platform may simply query using one of the platform CRM access APIs. The GUID may be considered the CRM equivalent of a primary key in a database. In some embodiments, a GUID may be applied to a range of objects in the CRM and may include custom objects with respect to the ID numbers.

In some embodiments, once an object ID is available, the system may directly query (e.g., via the API) that object based on the ID. There may be some objects which have multiple campaign names. If a campaign were renamed multiple times, the corresponding campaign object may be stored under the ID for multiple versions of the name. Even though this campaign was renamed multiple times, the corresponding campaign object may be accessed independently of the various names because the campaign UTM to GUID and validation methods and systems may generate a UTM that may use an encrypting of the unique object ID. The system may use that object ID (decrypted from the URL/CTM) to directly query a CRM distributed database for the campaign object. By retrieving the object from the CRM, properties of the object, including the entire group of properties of the object along with older versions of properties of the object stored in the object, may be accessed from the object.

An exemplary action associated with the compound UTM campaign naming techniques employed by the campaign UTM to GUID and validation system described herein may include using a URL to easily access the specific campaign object in a distributed CRM database. This may be due at least in part to the system's ability to directly determine a unique identifier (GUID) of the object with at least the UTM portion of the URL. This action may include fetching the UTM_campaign value in the URL and decrypting the last portion of the value to get the version of the object that may be associated with the campaign name found in the first portion of the UTM_campaign value. This version (e.g., the nth version) may also denote how many times the campaign object has been renamed. Another action may include obtaining the object ID (e.g., derived by decrypting the last portion of the UTM_campaign value), and then using the obtained object ID (e.g., as a database object index) when fetching the campaign object from a CRM. Yet further, an action may include validating the UTM name in the URL with the nth version of the campaign's name. If it matches, the system may validate access to and/or pass the object.

In some embodiments, a URL may be used in a process to decrypt a GUID of a campaign object associated with a UTM. The system may fetch the last value in the URL and may decrypt it to get the version, which may also denote how many times the object ID is encrypted. The system may next decrypt the object ID n times where n may be the version number. The system may next obtain the object ID and fetch the campaign from the CRM. The system may then validate, e.g., by matching the name of the nth version of the campaign's name. If it matches, the system may validate or pass the object.

In some embodiments, an example process to generate a "CTM_campaign" parameter for a UTM from a campaign object in a CRM may include the following steps: (i) take a human attributed campaign name (HGCN), such as the latest name from the "names" array in the corresponding object="My first campaign"; (ii) take the object ID of the campaign object and the version of the HGCN in step (i) (this may be the index of the HGCN in a name array of the object)="objectId=36792613638 and version=1"; (iii) encrypt object ID version (e.g., use advanced encryption standard (AES) encryption) to form a "versioned_ID"="encrypt("36792613638 1")->+9sXBk-wpk/JzQYWOHpRdvw=="; (iv) append this encrypted "versioned_ID" to the campaign name from step (i) (e.g., <campaignname><space><encrypted version_ID>)="My first campaign +9sXBkwpk/JzQYWOHpRdvw=="; (v) URL may convert the above payload="My%20first%20campaign%20+9sXBkwpk/JzQYWOHpRdvw=="; and (vi) assign it as a value of the "CTM_campaign" attribute for the URL.

With each renaming, a new URL-converted UTM may be generated. For example, a campaign with an object ID (e.g., object ID: 36792613638) may be converted to the following UTMs (e.g., where each UTM may reflect an impact of renaming the campaign): a) My%20first%20campaign%20+9sXBkwpk/JzQYWOHpRdvw==; b) My%20campaign%207sQO5Arq1+YPGVXaOjHMnA==; c) The%20campaign%20moOlwPraVOmX5hGQoscgUQ==; d) The%20-best%20campaign%20ever%20NOjjklTe58jAavCjfpds2g==

Figure 4:
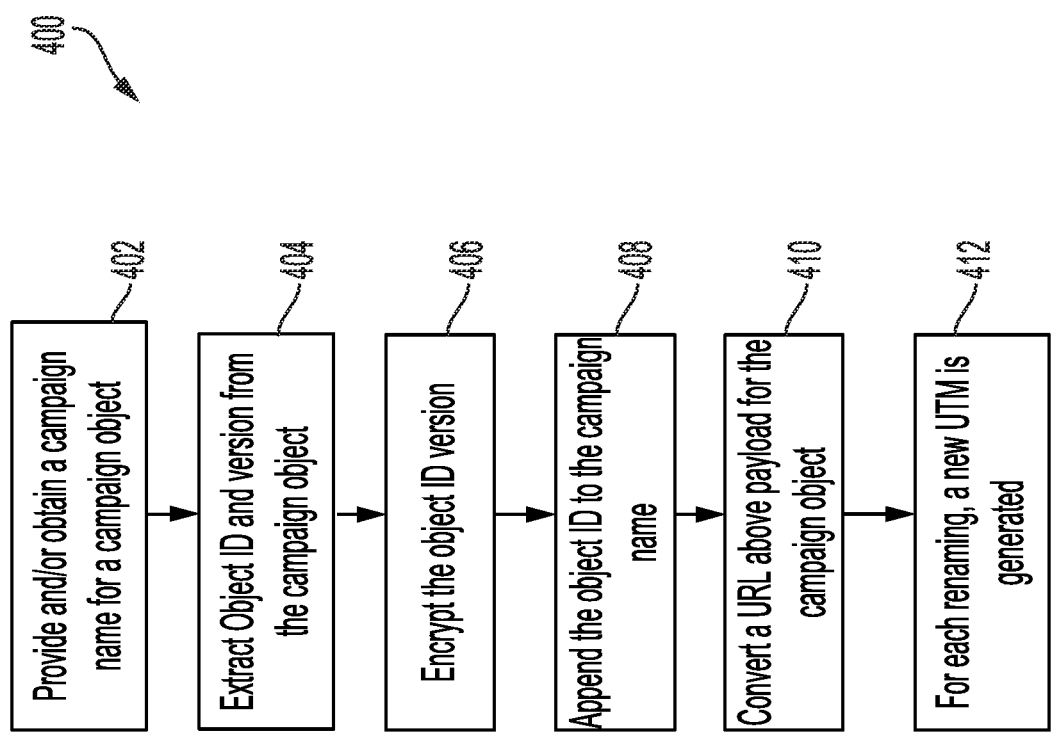
FIG. 4 is an example flow chart illustrating a set of processes for using the UTM to GUID and validation system of the multi-service business platform, according to one or more embodiments of the disclosure.
Figure 5:
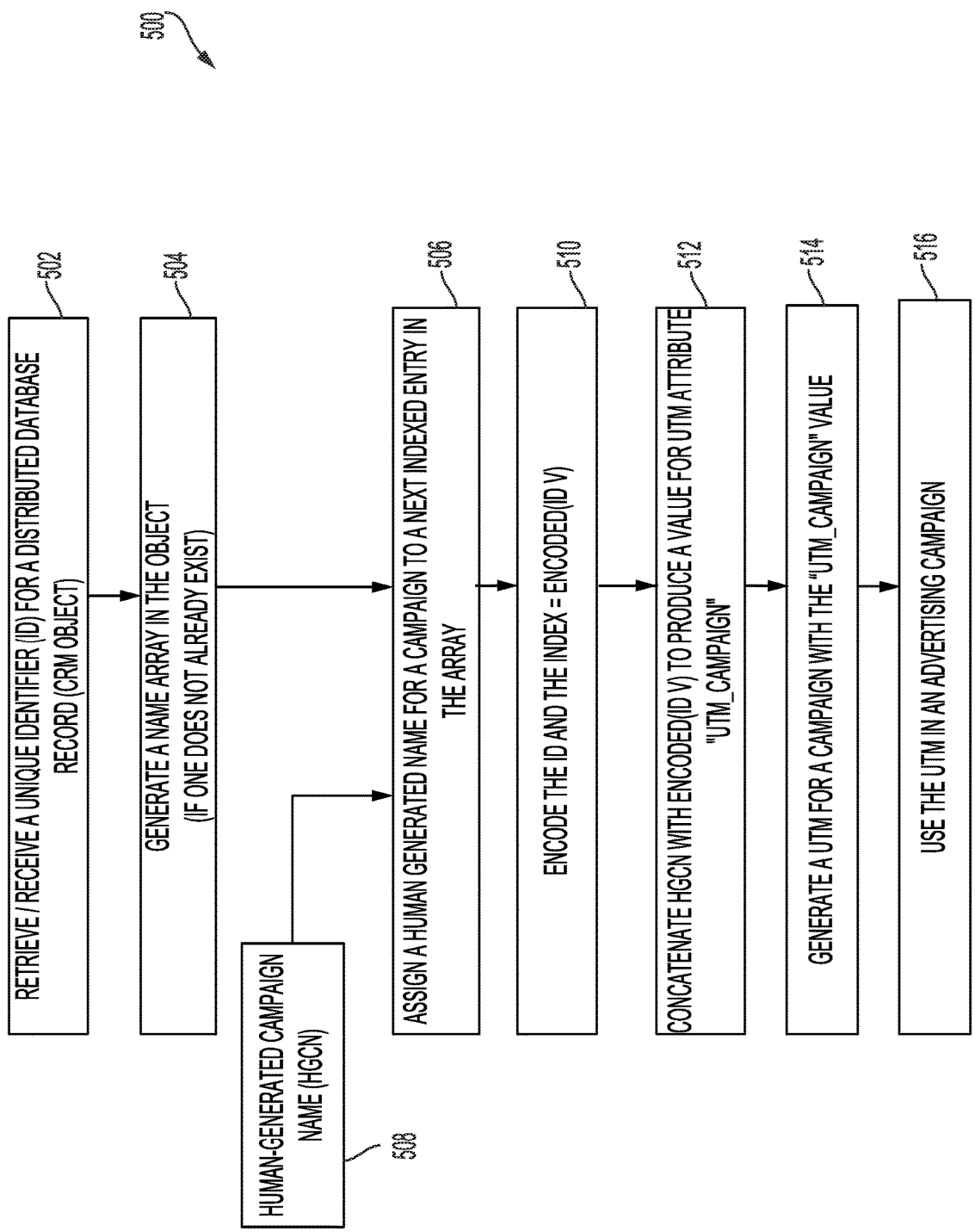
FIG. 5 is an example flow chart illustrating a set of processes for using the UTM to GUID and validation system to produce a UTM that is unique for a human assigned campaign name, according to one or more embodiments of the disclosure.

FIGS. 4 and 5 depict a process for generating a UTM with the campaign UTM to GUID and validation system 101. The figures progress from a broad depiction in FIG. 4 to a detailed depiction in FIG. 5 of the process. Referring to FIG. 4, a flow chart is depicted illustrating an abstracted set of operations of a method for using a campaign UTM to GUID and validation system (e.g., campaign UTM to GUID and validation system 101) of the multi-service business platform 510 to validate campaign objects and convert a campaign GUID to a UTM. The flowchart 400 may include a step in which a campaign name for a campaign object may be provided and/or obtained at 402. An object ID and version may be extracted from the campaign object at 404. At 406, the extracted object ID and version may be encrypted. At 408, the encrypted object ID and version string may be appended to the campaign name from 402. A URL UTM payload may be converted that may facilitate identifying the campaign object from the URL at 410. For each subsequent renaming of the campaign, as depicted at 412, a new URL UTM payload may be generated by following the flow of the flowchart 400.

Referring to FIG. 5, a flow chart 500 illustrating a set of operations of a method for using a campaign UTM to GUID and validation system (e.g., campaign UTM to GUID and validation system 101) of the multi-service business platform. Specifically, for example, FIG. 5 shows a process for generating a UTM_campaign identifier (e.g., "CTM_Campaign") that may uniquely map to at least one distributed CRM database (e.g., single distributed CRM database) object for each human generated name. In particular, the steps in this flow chart 500 may be performed to produce a UTM that may be unique for a specific human assigned/generated campaign name while maintaining direct access to the campaign objects in the distributed CRM database identified by a GUID independently of the human generated campaign name (HGCN). In some embodiments, FIG. 5 depicts generating a value for a UTM campaign identifier attribute (e.g., UTM_campaign) for each HGCN that may uniquely map to a distributed CRM database object instance identified by the GUID in flowchart 500. At 502, a unique identifier (e.g., a GUID) may be received/retrieved. This GUID may be generated using the random number generation techniques described herein and elsewhere that may include producing a data string that may be substantially unique. This GUID may be associated in a one-to-one relationship with an object instance in a distributed CRM database or the like that may optionally be configured for use with an advertising campaign that may rely at least in part on existing UTM technology. At 502, the GUID may be received from a random number generating system. In some embodiments, the GUID may be retrieved from the CRM database. The CRM database may be configured with at least a default advertising campaign object instance (e.g., optionally referred to herein as a core object) to which the GUID may be assigned. In some embodiments, the GUID may be preassigned to one of a set of default advertising campaign object instances that may be allocated as new campaigns that may be instantiated in the database. In some embodiments, the GUID may be generated contemporaneously with instantiation of a new campaign, such as when a user may request creation of a new campaign. The remaining processes of the flowchart 500 may proceed substantially independent of how a GUID may be sourced at 502.

As a next step in instantiating a new campaign (at 504), a name array may be generated and/or configured in the object instance of the GUID (if one does not already exist). Alternatively, step 504 may be bypassed when an existing object instance of the GUID may already include a name array.

In some embodiments, a name array within an object instance may be use in a JSON script that may include a GUID value for "objectId" of "36792613638" and name array "versions" that may include four (4) versions of a HGCN for this GUID/campaign/object instance. Each "value" entry in the "versions" array may represent a unique HGCN for the advertising campaign with GUID "36792613638". In some embodiments, each indexed entry in the "versions" array may be treated by the methods and systems herein as a unique version of the campaign that may correspond to the object instance. Each entry in the "versions" array may be accessed by an index number. There may be versions 1 through 4 of the HGCN. As will be explained for step 506, when a campaign may be renamed (e.g., given a new HGCN), an entry may be added to the "versions" array. Therefore, in this JSON script example embodiment, campaign 36792613638 may be renamed three (3) times since being instantiated. Following conventional JSON script rules, an order of campaign renames may be merely the reverse of the order of elements presented in the "versions" array. In this example, the HGCN at instantiation of this object instance (e.g., "My first campaign") may, by default, be assigned index 1 in the "version" array. The most recent name may be "The best campaign ever" which may be assigned index 4 in the array. An array index value for a given HGCN may correspond to a unique version of a campaign assigned to a GUID. Therefore, version 1 of the campaign identified in the database as 36792613638 may correspond to the first HGCN and version 4 of this campaign may correspond to the most recent HGCN.

In some embodiments, information, such as object ID, version, and other properties and/or their values may be stored in an encrypted form in a CRM object, such as a campaign CRM object instance.

In some embodiments of utilizing JSON, at 506, a human generated campaign name (HGCN) 508 may be assigned to a next indexed entry in the array. During an instantiation of an object instance for a campaign, the next indexed entry may be entry 1 in the array.

At 510, a combination of the GUID and index that may correspond to the HGCN (which may also be referred to as the version of the GUID) may be encrypted. A range of existing encrypting techniques may be applied, including without limitation advanced encryption standard (AES) encryption. In some embodiments, for a GUID of 36792613638 and a version of 1, AES encryption may produce: "+9sXBkwpk/JzQYWOHpRdvw=="

At 512, the encrypting of the combination of GUID and version may be appended to the corresponding HGCN 508 and recorded as a value of a UTM attribute for use in UTMs for the campaign. In some embodiments, this UTM attribute may be a "CTM_campaign" attribute. A "CTM_campaign" attribute value for one of the HGCNs in the "versions" array may be generated at 512 to include a concatenation of an HGCN with an encrypting of the "objectID" for the campaign and the index into the "versions" array that may correspond to the selected HGCN, such as: <<My first campaign>><<AES encrypting(36792613638 1)>> that when converted for URL compatibility may result in a "CTM_campaign" attribute value of: <<My%20first%20campaign%20+9sXBkwpk/JzQYWOHpRdvw>>.

The exemplary embodiment of FIG. 5 may further include combining the "CTM_campaign" value generated in step 512 with other campaign attributes to produce an HSGN-specific UTM at 514, such as for use in an advertising campaign, such as in a URL.

The exemplary embodiment of FIG. 5 may further include an optional process 516 in which the UTM generated at 514 may be used in an advertising campaign, such as by encrypting the UTM into a URL compatible form and applying the encrypted UTM in an Internet Protocol-based advertising campaign, email campaign, embedding in web pages (e.g., as a selectable link), etc.

Further, the processes of FIG. 5 may be embodied variously. In one exemplary embodiment, processes 502 and 504 may be performed when a new CRM database object may be instantiated. These processes may be performed for several campaign instantiations, such as to prepare a set of campaign CRM object templates. One or more CRM object templates may be configured further as a core object, which may include specific default values. In some embodiments, default values of a core object may include values for an advertising campaign as may be defined by an operator of a multi-business service platform. In some embodiments, an object instance that may be uniquely identified by a GUID may be configured for multi-service business platform features other than advertising campaigns. In some embodiments, processes 502 and 504 may be performed responsive to receiving the HGCN 508 or as a workflow that may include process 506 where a received HGCN 508 may be applied to the CRM database object.

In some embodiments, process 506 may be performed each time a new HGCN 508 may be received, such as when a campaign administrator generates a new name for an existing campaign. Processes 502 through 506 may be performed when a newly named campaign may be instantiated as an object in a CRM database. These processes of the flowchart depicted in FIG. 5 may result in configuring a portion of an object in a CRM database that may, at a different time, be used for generating UTM content.

In some embodiments, processes 510 through at least 514 may also be performed contemporaneously with process 506, but may alternatively be performed distinctly from processes 502 through 506. Encrypting processes at 510 and concatenating processes at 512 may optionally be performed during activation of a campaign. Generation of a UTM, such as may occur at 514, may be performed contemporaneously with process 512, but may alternatively be performed distinctly, such as during execution of a campaign for the HGCN 508 when a UTM may be required, such as when a user may select a link in a webpage, email, posting, etc. that may be part of a UTM-based campaign.

Figure 6:
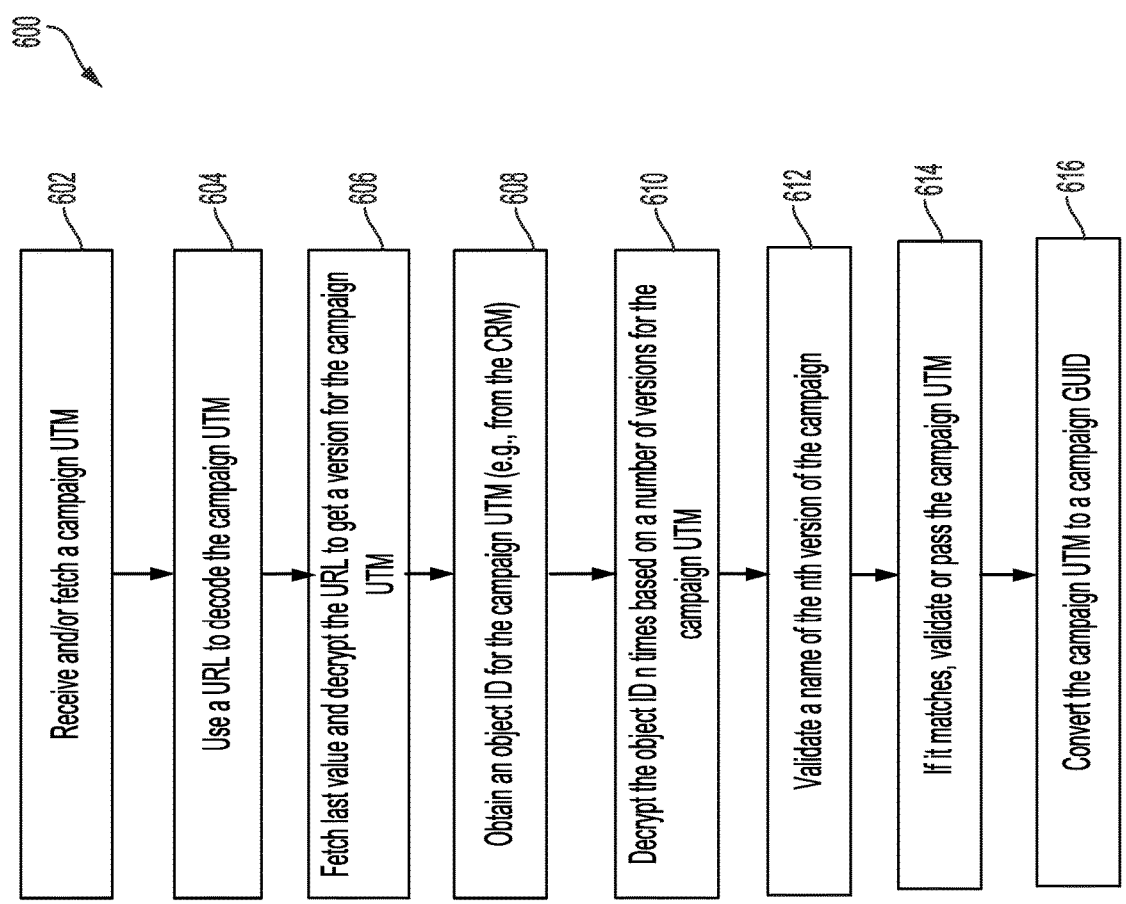
FIG. 6 is an example flow chart illustrating a set of processes for using the UTM to GUID and validation system of the multi-service business platform to validate campaign objects and convert a UTM to GUID, according to one or more embodiments of the disclosure.
Figure 7:
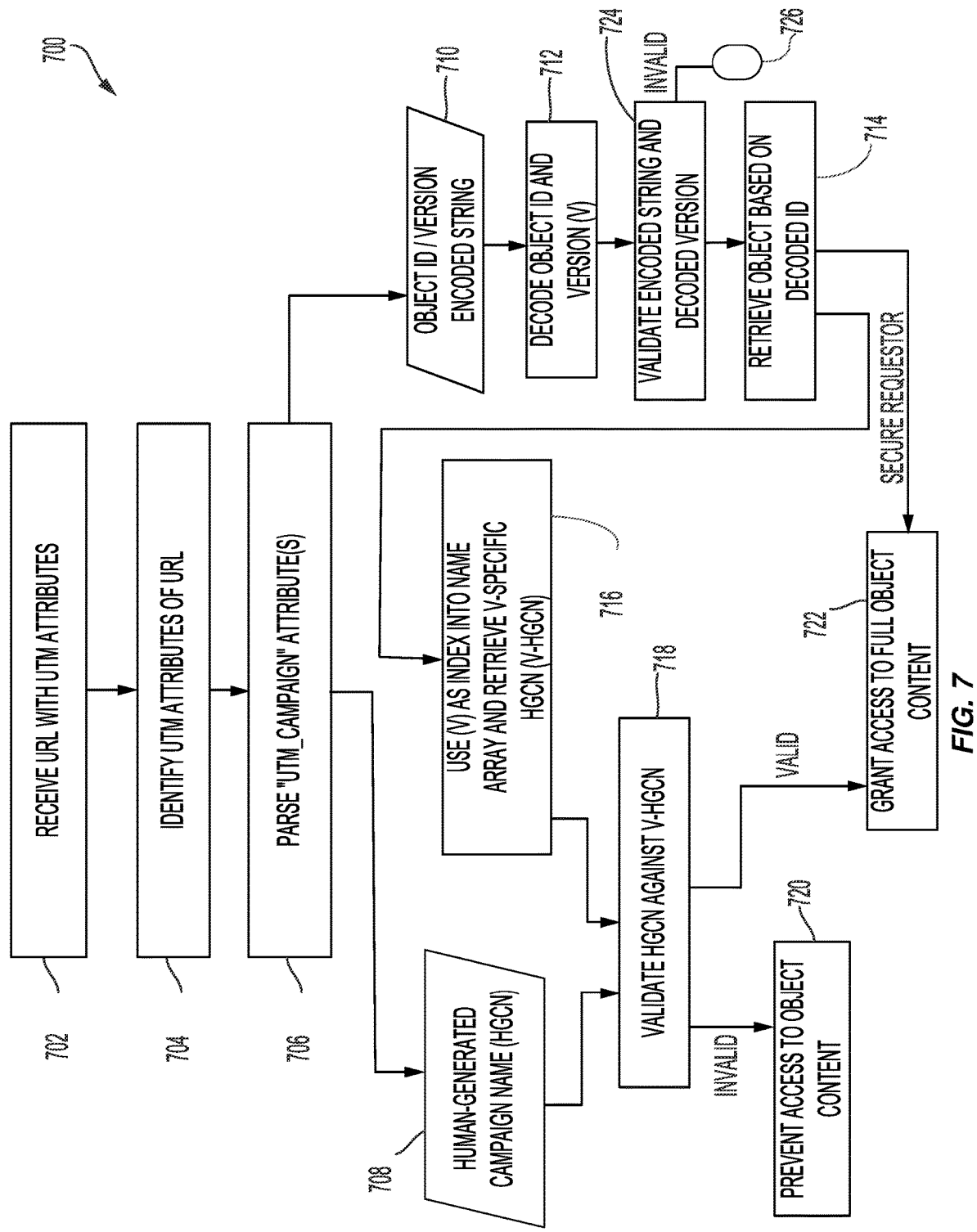
FIG. 7 depicts a flow chart illustrating a set of processes for using the UTM to GUID and validation system to validate a UTM, according to one or more embodiments of the disclosure.

FIGS. 6 and 7 depict a process for retrieving a CRM object based on a UTM in a URL with the campaign UTM to GUID and validation system (e.g., campaign UTM to GUID and validation system 101). The figures progress from a broad depiction in FIG. 6 to a detailed depiction in FIG. 7 of the process. FIG. 6 is a flow chart illustrating a set of operations 600 of a method for using a campaign UTM to GUID and validation system (e.g., campaign UTM to GUID and validation system 101) of the multi-service business platform to validate campaign objects and convert a campaign UTM to GUID. At 602, the system may receive and/or fetch a campaign UTM. At 604, the system may use a URL to decode the campaign UTM. At 606, the system may fetch the last value and decrypt the URL to get a version for the campaign UTM. At 608 the system may obtain an object ID for the campaign UTM (e.g., from the CRM). At 610, the system may decrypt the object ID n times based on a number of versions for the campaign UTM. At 612 the system may validate a name of the nth version of the campaign. At 614, if it matches, the system may validate or pass the campaign UTM. At 616, the system may convert the campaign UTM to a campaign GUID.

Referring to FIG. 7, a flow chart depicts a set of operations 700 of a method for using a campaign UTM to GUID and validation system (campaign UTM to GUID and validation system 101) of the multi-service business platform to validate a UTM and provide direct access to campaign objects in a distributed CRM database. In some embodiments, this set of operations may facilitate accessing a customer relationship management (CRM) distributed database record or object from a UTM based on each record in the CRM being identifiable by a unique ID, such as a GUID described herein.

In some embodiments, the set of operations 700 may include receiving a URL that may include a UTM that includes one or more parameterized attributes at 702. In some embodiments, at least one UTM attribute may be a "CTM_campaign" attribute. At 704, the UTM may be processed so that at least the "CTM_campaign" attribute and corresponding value(s) may be distinguishable.

At 706, a portion of the UTM attributes including at least the "CTM_campaign" attribute may be parsed. Parsing the "CTM_campaign" attribute may be based on an understanding of a predetermined structure for a value thereof based on the methods and systems described herein for generating a value of a "CTM_campaign" attribute, such as based on the processes described in association with at least processes 510 and/or 512 of the UTM flowchart 500 depicted in FIG. 5. In some embodiments, a value for the UTM attribute "CTM_campaign" may be structured as a text string of a human generated campaign name (HGCN) that may be followed by an encrypting of an identifier associated with the HGCN. The methods and systems for UTM generation and use in association with a multi-service business platform may be configured to process UTM attributes, such as "CTM_campaign" based on this understanding. This may provide an advantage over other, third-party service platforms that may rely on UTM technology for managing digital communication/advertising/promotional/tracking campaigns by facilitating a determination that each of two or more distinct "CTM_campaign" values detected in such promotional efforts may reference a common campaign.

Processing at least a "CTM_campaign" attribute of a UTM at 706 may result in detection of: (i) a human generated campaign name (HGCN) 708 portion, and (ii) a string of characters conveying an encrypting of an object identifier (e.g., GUID) and a version. In some embodiments, a value for a "CTM_campaign" attribute may include the following text: <<My first campaign+9sXBkwpk/JzQYWOHpRdvw==>>. Processing this "CTM_campaign" attribute value may include separating the HGCN portion (708) <<My first campaign>> from the encrypted portion (710) <<+9sXBkwpk/JzQYWOHpRdvw==>>. The HGCN portion 708 may be stored for later use, such as for taking security measures including validating the UTM conveying this "CTM_campaign" attribute value.

The encrypted portion 710 (e.g., object ID/version encrypted string) may be passed to process 712 where the encrypted portion may be decrypted, such as through use of AES decryption. This decrypting process may be configured to produce two decrypted output values: (i) an object identifier value, and (ii) a version value. The object identifier value and version value may be uniquely associated with an object instance in a CRM distribute database of the multi-service business platform. For example, the encrypted portion <<+9sXBkwpk/JzQYWOHpRdvw==>> may be decrypted at 712 using, for example, AES decryption to produce an object identifier value 36792613638 and a version value 1. In some embodiments, decrypting of the encrypted portion may be performed using the same approach used to produce the encrypted portion. Examples of such encrypting may be depicted in FIG. 5 and in association with descriptions herein for process 510.

In some embodiments, optional process 724 may be performed after process 712 to validate the encrypted portion 710 (e.g., validate encrypted string and decrypted version). At 724, the decrypted version value may be used (e.g., as an index into an encrypted portion validation table) to identify a stored encryption, such as in the encrypted portion validation table. Referring to FIG. 8 may be an example of this table. If, during this optional step, validation is successful, such as if the encrypted string 710 matches a corresponding value in the validation table, the process 700 may proceed such as by proceeding to process 714. However, if this optional validation step fails, the flow 700 may be terminated by proceeding to termination 726. Actions taken at termination 726 may include notifying an administrative user, proceeding to process 720, etc.

In some embodiments, proceeding at 714, the decrypted object identifier value may be used, such as by a secure and/or system process, to access a CRM database of the multi-service business platform to retrieve a corresponding object instance (e.g., based on decrypted ID). Data resulting from process 714 may include information that facilitates validating the "CTM_campaign" value parsed in step 706. In some embodiments, data resulting from process 714 may include one or more portions of a JSON script.

In some embodiments, at 716, the version value decrypted from the encrypted portion 710 at 712 may be used as an index into an array of campaign names found in the object retrieved at 714. In this example, the decrypted object identifier value may be 36792613638 and the version value may be 1. This indexing of an array of campaign names may result in a version-specific HGCN that may be stored for performing security measures to secure a CRM database of the multi-service business platform. Exemplary techniques for using the version value as an index into an array of campaign names, such as to retrieve a version-specific HGCN, may be used in the JSON script.

At 718 in the flow 700, the previously stored HGCN retrieved from the "CTM_campaign" attribute value 708 at 706 may be used to validate the UTM received at 702. In some embodiments, validating may include comparing a pair of corresponding HGCN values, such as the stored HGCN and the version-specific HGCN determined at 716.

Based on a degree of comparison at 718 (e.g., text string matching, hash and match, etc.), the UTM received at 702 may be validated or may be invalidated. If a result of validating at 718 confirms that the UTM received at 702 is invalid, access to the contents of the database object instance that corresponds to the object identifier value portion of the "CTM_campaign" attribute may be prohibited at 720. In some embodiments, if the HGCN retrieved at 714 from the object instance identified in the encrypted portion of the "CTM_campaign" attribute does not match the HGCN portion of that attribute (e.g., the HGCN stored at 706), then the UTM received at 702 may be invalid. Action taken after an invalid UTM determination may include a range of remedial and security actions, such as halting a process executing that has provided the received UTM, flagging the condition to an administrative user, etc. However, if a result of validating at 718 indicates that the two HGCNs sufficiently compared (e.g., are duplicative), then access to at least the portion of the CRM database containing the object instance identified by the decrypted object identifier may be granted at 722.

In some embodiments, access to content of the object instance determined at 714 may be granted based on a degree of confidence in a process or user that has requested access to the object instance, such as by providing the URL with UTM attributes received at 702. As an example, if a user process, executing in a secured user space, has been flagged by a system security monitoring facility as secure for the purposes of accessing at least a campaign portion of a CRM database of the multi-service business platform, flow 700 may proceed from process 714 directly to 722, thereby bypassing validation processes 716 and 718.

In some embodiments, the UTM to GUID and validation system 101 may provide a new way of generating UTM fields. For example, given an object ID of the campaign for which a user wants to generate a corresponding UTM, one could combine an encrypting of this object ID followed by space, followed by an encrypting of the version of the campaign name. This may be used to generate a UTM for a renamed campaign. In some previous example systems, a campaign tracking system may have used the campaign name as the only campaign identifier in a UTM. In this example new unique way of generating a UTM, it may be possible to decrypt at least a part the UTM (e.g., the encrypted object ID and encrypted version) to access and retrieve information from the corresponding campaign object. In some embodiments, as noted using a GUID, it may be possible to use that object ID to directly query the object. Information in the object may include a campaign name and corresponding version. If the campaign name in the UTM may get validated against (e.g., matches) the campaign name in the object that corresponds to the version, then the system may determine that this UTM may be a valid UTM and the system may provide the information of the campaign found in the object. If this validation does not work, it may mean that a third party may be trying to access the object so the system may not provide any information.

In some embodiments, a primary benefit of this new way of generating UTM fields may be saving a database step or process when using the newly generated UTM to access a corresponding campaign object. Notwithstanding a campaign tracking system's ability to support changing campaign names, reducing the processing required to access a campaign object remains a benefit. This benefit may exist even if a system does not support renaming campaigns and UTMs.

In some embodiments, validation when fetching a campaign by UTM may be performed in the following exemplary sequence of steps: (i) UTM "CTM_campaign" parameter passed in the URL="The%20campaign%20moOlwPraVOmX5hGQoscgUQ=="; (ii) convert from URL coding to get the UTM "CTM_campaign" string entry="The campaign moOlwPraVOmX5hGQoscgUQ=="; (iii) split this string by <space> and get the last portion from the split data=moOlwPraVOmX5hGQoscgUQ==; (iv) the remainder is the human-generated campaign name (HGCN)="The campaign"; (v) decrypting "moOlwPraVOmX5hGQoscgUQ==" may provide direct access to the CRM object, such as decrypting gives object ID=36792613638 and version=3; (vi) since the object ID may be a unique identifier of CRM objects, this may allow for the ability to quickly fetch the object independent of the HGCN (e.g., with all versions of the name); (vii) validate if the third ($3^{rd}$) entry in the name versions array is "The campaign"; and (viii) If yes, the UTM may be valid and corresponds to the source campaign object with the object ID 36792613638.

In some embodiments, UTM generation and validation for a CRM object instance may be similar to core CRM objects. In some embodiments, each campaign CRM object instance may have at least one name and properties associated with versions. Information from the campaign CRM object instance such as object ID, campaign name version, campaign name, etc. may be extracted and used to generate a UTM using the exemplary process above. Even if the name changed, object IDs and versions may be obtained from a URL after decrypting the relevant portion thereof. A UTM may be validated by fetching an object instance (e.g., using the GUID found in the UTM) and checking if the human generated campaign name in the UTM may be consistent with the name in the name versions array of the object instance based on the version value decrypted from the UTM.

In some embodiments, a campaign object instance may be queried by an object ID. Multiple database query-type APIs may be used to find campaign objects by IDs such that any object may be located by querying the related ID (e.g., unique identifier for the object). Where objects have multiple names (e.g., renamed multiple times), there may be multiple versions that have the same encrypted object ID which may be queried. Locating the campaign object instance may provide access to an entire list of properties and various versions of the object instance.

Use of a GUID that identifies a campaign within each UTM of the campaign may also provide an advantage for a platform capable of handling a single campaign with multiple name variants at least because third-party campaign performance tracking systems may detect the distinct campaign names without any feasible way of determining that two campaigns with different "CTM_campaign" values are derived from a single campaign.

In some embodiments, use of JSON or the like array indexing capabilities, such as for capturing an advertising campaign, may provide an implicit form of campaign version control. As each new human generated campaign name is introduced into a campaign name array (which may be a prerequisite when making other changes in a campaign), the index of the new HGCN may become the version of the campaign. Further, use of the JSON (or the like) array indexing capabilities enables various types of validation that may be performed throughout the life of a campaign and/or when accessing a CRM or other database of the campaign at least because each new human generated campaign name may produce both a unique version value and a unique encrypting of the version and GUID for the campaign. Therefore, a version and/or a campaign GUID may be validated against a HGCN portion of the "CTM_campaign" attribute. Further an encrypting of the GUID/version may be validated for each HGCN and for each version. Any mismatch among HGCN, version, GUID, and encrypted GUID/version may be detected and flagged for enhancing safety of campaign data. This may be particularly helpful for multi-tenant CRM databases where data collisions, either inadvertent or intentional may be detected and remediated.

Registration Systems and Processes

Background of Registration Patterns

In some embodiments, a multi-service business platform may be organized around an object-oriented database, such as a customer relationship management (CRM) database. Such a CRM database may include a range of data objects (e.g., types of objects) that each contain several data fields and corresponding field values that may be configured for a purpose, such as operating an advertising campaign, tracking correspondence, etc. One or more of these data objects may be instantiated as a variety of object instances that effectively replicate a structure of the data object with instance-oriented values. As an example of object type instantiation differentiation, an advertising campaign object type structured with a "campaign_name" field may be instantiated as a first instance of a "campaign" type object with a value of "first" attributed to the "campaign_name" field and a second instance with a value of "second" attributed to the "campaign_name" field.

In some embodiments, structures of objects and values assigned to fields of such structure in a CRM may be configured for core functionality of a multi-service business platform. However, the content of these objects may be utilized in various services such as projects, applications, and contexts, such as a calendar, CRM activity monitoring, CRM performance, export to/from 3rd party platforms, an activity feed service (e.g., a social network feed), an asset association service (e.g., the ability to associate an email with a campaign), a campaign management service, a commenting service, etc. Further, not all such uses, applications, and external systems may be directly compatible with the structures and content of objects in the CRM database. As an example, a campaign type object may include a "campaign start date" field with a mmddyyyy structured content. A calendar application (e.g., using a calendar system service) may require a minimum set of information about a campaign to ensure that it may be displayed properly in a visualization of a calendar that may display campaign activities and other information. Such a calendar application may require a "start date" attribute in the form of "yyyymmdd" to visualize activities. Therefore, it may be beneficial for some type of easily-performed adaptation to occur when a calendar application is requested/instructed/automated to display the campaign type object (and related activities). The registration pattern systems and processes described herein may facilitate this adaptability through new and interesting uses of elements stored in a CRM database. In general, new types of CRM database elements, referred to herein as one or more of a "registration definition element" or a "registration association element", may provide a standardized approach for enabling a range of database content utilization, maintenance, and access capabilities. When these new types of registration data structures (herein registration elements) are stored in a database, such as in a database of a multi-service business platform, such a database may be configured to be self-adapting for new and interesting uses, such as CRM-powered applications, third-party applications, interfacing the CRM with other portals, other systems, CRM object maintenance, etc.

A few terms used herein may be related. In general, the term "registration pattern" may in certain contexts refer to an overall approach of using data in the CRM (or stored in association with the CRM) to facilitate operating/managing/maintaining other elements (e.g., objects) and/or may in certain contexts refer to techniques for facilitating operation of applications, such as CRM-powered applications that make use of objects and object content. In some embodiments, this overall approach may include computer implemented systems and methods that perform registration pattern operations. In general, the term "registration definition" may refer to an arrangement of data (e.g., a syntax, ontology, etc.) that may facilitate use of object properties and their values by applications (e.g., generally "consumers" of object properties) independent of structural or logical differences between how the data may be represented in the CRM and how a consuming application/portal/user/system may require the data to be represented. In general, the term "registration association" may refer to an arrangement of data that may facilitate maintaining consistency of related (e.g., associated) objects in the CRM. Generally, the term "registration element" may refer to any data item/structure, including registration definitions and registration associations that may be useful for implementing the systems and processes of registration patterns that may be stored in or in association with the CRM. In general, an instance of a registration pattern, referred to herein as "registration association element instance", "registration definition element instance", or "registration element instance" may refer to a CRM object type-specific registration association or definition that may be stored in or in association with the CRM. As an example, a registration definition campaign object-type specific element instance that is stored in or in association with the CRM may be referred to herein as a registration element instance. In some embodiments, a registration association that is stored in or in association with the CRM may be referred to herein as a registration element instance. In some embodiments, use of the term registration patterns may refer to processes and systems described herein that employ registration definitions, registration associations, registration elements, and/or registration elements instances. In some embodiments, registration associations may be created and used to link a registration definition with (e.g., by association or relationship to) various elements including registration elements, custom objects, core objects, other objects, other registration definitions, etc.

In some embodiments, registration patterns may be implemented as a plug-in for a service that may be associated with a CRM platform, such as an activity feed service, an asset association service, a campaign management service, a calendar service, etc. The plug-in may be used to connect functionality into the various services such as SMS functionality. In some embodiments, registration patterns may be utilized for populating navigation structures, reporting tools, task management, revenue attribution, access management, audit trails, object organization (e.g. folders, tagging), marketing asset performance analysis, external integrations (e.g., social networks, ticketing systems, 3rd party tools, etc.), automation & workflow tools, asset conversion (e.g., webpage to email), export tools, user interface configuration (which features are available for which object types), or any other scenario where an application operates on multiple object types that may be a subset of all available object types and may or may not require object specific configuration.

In some embodiments, a registration definition or a registration association may optionally be stored within (or in association with) a customer relationship management (CRM) data set. Stored registration definitions and/or registration associations may be referred to herein as registration elements. While registration elements may be embodied similarly to one or more objects in the CRM data set, use of the term "element" herein when applied to the term "registration" (e.g., a registration element) may connote a data item/structure stored in or in association with a CRM that may embody content, structures, attributes that may not be fully compatible with other objects of the CRM. In some embodiments, registration elements may allow, among other things, other (optionally pre-existing) objects (e.g., custom objects and/or core objects) to be adapted for new uses and processing without forcing use and/or processing constraints that may require altering the pre-existing objects. A benefit of using registration patterns may be that these new and adapted uses may occur without requiring new code to be written (or existing code to be modified) for each such use. Use of registration patterns may also eliminate needing to create use-specific shadow objects in the CRM. For example, allowing a pre-existing CRM object (e.g., webinar object, seminar object, campaign object, etc.) to be processed for display by a calendar application may occur. In some embodiments, core objects (e.g., which may be pre-defined) may include contact objects, company objects, deals objects, and ticket objects. New objects that may not be predefined objects may be referred to as custom objects. In some examples, the webinar object may be a unique object (e.g., portal specific object) that may be similar to a custom object.

In some embodiments, an aspect of registration pattern systems and processes functionality may be using registration elements, optionally stored in the CRM, to configure a CRM powered application. This may enable the CRM to have its own configuration and adjustment mechanism, which may make processes easier for customers who want to closely integrate with the CRM and which may be simple for integrators. In some embodiments, one benefit may be that all access may be made through a single application programming interface (API) or another programmatic interface. In some examples, a second system for managing interactions with the CRM may not be required for various applications, services, and third-parties to interact with the CRM. Providing access to the CRM through a single API or other programmatic interface may eliminate such second systems using a separate database to hold configuration information for these types of CRM interfacing processes.

In an example, an integrator uses a specific data structure for defining an online university course object, and the integrator prefers that these types of courses show up in a calendar application (e.g., rendered on the CRM-powered calendar application such as to announce when the courses were being taught). The integrator may create a registration definition (e.g., registration schema for some examples). The integrator may optionally store this registration definition as a registration element in the CRM. Use of this registration definition, such as by the single API, may enable the calendar application to interpret the integrator's specific data structure to facilitate rendering course information in a calendar. The integrator course object may be rendered as a fully-fledged, fully integrated object in the calendar. Using registration definitions as a form of registration patterning may be used with other types of CRM-powered applications, such as a campaign application. With use of a campaign application compatible registration definition (e.g., a registration definition that facilitates mapping content/fields of the specific course object to campaign object content/fields), a specific course object of the integrator may appear to a campaign application as if it were fully integrated.

There may be several advantages to this registration system and process in addition to the purely functional benefit. For example, some example embodiments of the registration pattern system and process may avoid the need for a two-system approach. While the examples herein may be based on online types of events (e.g., university courses, blog posts) support for offline events (e.g., events that may not have an online component but may be physical events), for example, may be captured and supported by the registration pattern systems and processes described herein. In some embodiments, a registration definition element instance may be tied to a target consuming application-specific registration pattern that may be applied against several types of CRM objects (e.g., seminars, webinars, blog posts, emails, campaign elements, etc.).

In some embodiments, a registration association may be a registration pattern variant (optionally stored as a registration element within the CRM) that may allow for, among other things, establishing/maintaining continuity of content and structure of related objects in the CRM based on monitored CRM events, such as changes to one or more objects in the CRM (e.g., a change in an email distribution date). Use of registration associations when monitoring CRM events may facilitate factor-based CRM reporting across a CRM-based multi-service business platform, for example. In some embodiments, being able to tie a registration association across the platform framework may facilitate reporting on various factors that may impact more than one CRM object.

In some embodiments, data and information in a CRM data structure (e.g., a distributed database) may be associated with one or more objects. In some embodiments, given a list of customers, each individual customer may be represented by their own CRM object. Similarly for a list of blog posts, each blog post may be represented by its own CRM object. In some cases, the associated objects may be custom definitions created by or for the specific customer. From this perspective of managing elements in a CRM data set, registration patterns (e.g., definitions, associations, etc.) may be similarly configured or structured. For example, a calendar registration definition (e.g., referred to herein as a calendar registration definition element instance) may be stored in the CRM; however, this calendar registration definition may be a different type of object compared to an object type for use by a campaign application. It may be appreciated that a variety of other registration definitions may be stored within the CRM such as registration definitions for an activity feed service, an asset association service, a campaign management service, etc.

In some embodiments, registration patterns may allow for providing support for new types of data to a service (e.g., a calendar), such as webinar data. When a CRM object for a webinar is ready, an administrator may create a calendar registration definition for the webinar object that may, for example, facilitate use of information in the webinar object by a CRM-powered calendar application. In some embodiments, this webinar object-to-calendar application registration definition may contain a field that identifies that it is for the webinar object type. In some embodiments, a start date may be a field on the webinar object (e.g., color coded start date such as yellow by default when rendered in a calendar application). Another webinar object field may capture the title. A webinar may be a recurring item such that there may be another field regarding how often the webinar occurs. In some embodiments, a webinar object (or other CRM object) may have up to ten (10) or twenty (20) or more different data fields to which a corresponding registration definition (e.g., a webinar-to-calendar registration definition) may be applied for integrating the webinar object with a CRM-powered application, such as the exemplary calendar application. In some embodiments, for each distinct type of object to be rendered on a calendar, there may be a separate registration definition. For example, there may be one registration definition for blog posts, one registration definition for website pages, one registration definition for tasks, one registration definition for campaigns, etc. In some embodiments, this may be accomplished in a database table. In some embodiments, there may be separate registration definitions for each type of data (e.g., CRM object, such as a webinar object) to be rendered in a calendar. A database table may include a calendar application row that identifies what types of data may be provided to the calendar. It may also identify minimum required information to be provided to a calendar application so that an object may be displayed on the calendar. This information may be used to query the CRM data set for webinar objects to be rendered in the calendar.

One advantage to having all of this data and information in a single CRM and using a CRM object-like element to store a registration pattern data structure may be that there is no need to give outside vendors, integrators, or customers access to two different systems (e.g., the CRM and the separate database). Further, this may all be performed through a common set of APIs (and in some example embodiments a single API) used to access the CRM. In an example, rather than having to access the CRM to populate a bunch of data into a data set, and then logging into a web page (e.g., that includes a control panel) to arrange the data in the data set for configuring a calendar application, or rather than requiring access to two different APIs (e.g., one API for the CRM and one API for the calendar), use of registration patterns may facilitate accessing the CRM and configuring the accessed CRM data for use by a calendar without needing resources external to the CRM. Once granted access to the CRM through, for example, a customer portal, an integrator may create new CRM objects and corresponding registration definitions to keep processes running smoothly.

Referring to FIG. 1, a multi-service business platform 510 may further include a urchin tracking module (UTM) to globally unique identifier (GUID) and validation system 101 for enabling efficient and disambiguated access to a campaign object in a database, such as a customer relationship management (CRM) database based on an encoded string in a UTM property of a uniform resource locator (URL). The multi-service business platform 510 may also include a registration system 103 of registration patterns that enable independence of applications that consume CRM object data from the underlying structures of those objects while further enabling efficiently maintaining consistency and updating of objects. The campaign UTM to GUID and validation system 101 and the registration system 103 may communicate with various systems, devices, and data sources of the multi-service business platform 510.

Registration System and Process

Referring to FIG. 2, a system 201 of the multi-service business platform 510 may include a registration system 103 (that may include a registration definition service 209) connected to a storage system 550 and to a customization system 520 (that may include a registration definition service 209) via a set of APIs 610. The registration system 103 (and registration definition service 209 in some examples) may be used to create and use registration patterns. The customization system 520 may include the registration definition service 209 for creating and/or generating registration elements. Further, similar to the organization of custom objects, an ontology may include registration associations and/or registration definitions and an instances knowledge graph that may include registration definition and/or association element instances. The storage system 550 of the multi-service business platform 510 may include a knowledge graph 556 that facilitates associating core objects (e.g., campaign core objects 203) and associations with registration definitions and custom objects via the ontology. The knowledge graph 556 may further facilitate associating core object instances 205 with registration association element instances, custom object instances, and registration element instances via the instances knowledge graph. Further, the system 201 may include a campaign UTM to GUID and validation system 101 that may be connected to the storage system 550. A set of services 530 that are associated with the storage system 550 may include a system service 207 (e.g., a calendar system service, an activity feed service, an asset association service, a campaign management service, etc.) that may rely on one or more outputs of the registration definition system 103. Campaigns of the storage system 550 may be associated with the knowledge graph 556. The storage system 550 may include a set of multi-tenant data stores that may store several types of data including, without limitation, definitions, properties, values, associations, and instances. In some embodiments, the campaign UTM to GUID and validation system 101 and the calendar system of services 530 as shown may be connected to the features and/or components of the storage system 550. Also, the campaign UTM to GUID and validation system 101, the registration system 103, and the registration definition service 209 may be connected to the calendar system of the services 530 indirectly via the storage system 550.

Registration Definition Features

In some embodiments, the systems and processes of registration definitions described herein may include features that relate generally to a registration pattern with respect to a customer relationship management (CRM) system (also referred to as CRM). In some embodiments, the CRM may include customer objects, content objects (e.g., blog post CRM objects), registration definitions (e.g., calendar registration definitions), etc. When a "new" (e.g., new to a calendar application) type of object in the CRM (or new to the CRM) may be added to an application (e.g., calendar application), registration definition information may be updated or created for this "new" type of object (e.g., based on registration definition types such as a webinar definition type). When data of a CRM object that has not previously been used by a CRM-powered application (e.g., calendar application) is used, corresponding registration data may be updated. In this example, a registration definition element instance (e.g., within a calendar application registration definition element) that may be linked to the CRM object (e.g., based on the CRM object type) may be updated to reflect how this previously not relied upon data is to be handled by the calendar application.

In some embodiments, registration definitions may map attributes of a source object (e.g., Email sent date) to generic fields required by an application (e.g., start date for an event in the calendar application). Further, registration definitions may include a set of definitions on how to process items. Yet further, in addition to mapping data, registration definitions may also contain configuration information for instructing applications about use of these registration definitions, such as one or more conditions that may need to be present in a corresponding definition and/or object (e.g., a master registration definition activate/deactivate parameter value) for the registration definition to be applied. Further, use of specific features of a registration definition may be conditionally applied based on similar feature-specific context. In this way, an entire registration definition may be disabled or only portions of it may be disabled while others may be enabled.

In some embodiments, registration mappings and definitions may be utilized for different types of registration patterns. For example, a marketing calendar may support a campaign object type as depicted in a user interface (UI) filter that may allow a customer to display the campaign object or not by adjusting a field in the UI. The UI may display a code that the campaign object may be currently enabled for the calendar application use. Adjusting the field in the UI may send a request to the platform for disabling it from being rendered in the marketing calendar so that the campaign object may not appear anymore. Such a UI may be useful because this process of enabling/disabling does not apply only for enabling or disabling an object type but may also be used for changing a property in order to show the proper name or the like. In some examples, to bring campaigns back on the marketing calendar, the system may be used to do the inverse and change the UI field to set it to "enabled". In some embodiments, relying on the UI for registration patterns may allow for configuring a CRM object type for a given example in a relatively dynamic way. In some embodiments, the UI may rely upon APIs to effectively make the changes described in the registration definitions (e.g., enable/disable rendering of a campaign object in a marketing calendar, etc.).

In some embodiments, this dynamic configuration mechanism may be used for dynamic association of assets with campaigns through use of a campaign registration association. In some embodiments, different registration patterns may be used for the campaign association at least because a campaign may not require all the fields that a calendar requires. In some embodiments, similar processes may be applied here to disable use of an asset in campaigns so that the asset may not get associated with campaigns. In some examples, a user may merely use the UI to disable this registration. In some embodiments, some other information from an asset may be needed for fulfilling the campaign association.

In some embodiments, use of a registration definition and/or association may be activated or deactivated through use of one or more properties of an object, such as a scope property. In some embodiments, when visualizing a marketing calendar, for example that may not have a "MARKETING EMAILS" scope property defined, all the marketing emails may not be accessible to the calendar (e.g., not returned by use of a registration pattern). In some embodiments, use of some features for activating and deactivating use of registration patterns may depend on the user or the portal, which may be using/looking at the current calendar. In some embodiments, another approach for enabling and disabling use of registration patterns may include a gating strategy.

In some embodiments, a concept of gating, for example, for release of a new feature, may allow for controlled release of the feature across one or more of the portals. Gating may enable gradually releasing of the feature for different portals, such as in order to have control over bugs or some problems that the new feature may introduce. In some embodiments, gating may be enabled by a registration being configured with a gate name property. If a registration pattern includes a gate name property (e.g., "BETA"), and a portal (e.g., consuming application) may not be enabled (gated) for using this BETA feature, it may not access portion(s) of objects defined in this "gated" registration. If the application/portal is enabled for, in this example, "BETA" features, the corresponding registration pattern may be used to facilitate access to object content gated by this feature.

Another mechanism by which registration aspects may be activated/deactivated and/or enabled/disabled may include use of optional properties in a registration data structure. In some embodiments, a consuming application, such as a calendar application may identify object properties as being optional. A property that is optional may be processed by the registration pattern, but if it is not available in the source object being processed, the property may be ignored when rendering the object in a calendar, for example. Although optional properties are not mandatory per the target consuming application, when they are present and when there is a value for them in the source object, the optional properties may enable specific features for an application (e.g., for a marketing calendar application).

In some embodiments, records may be created in the customer relationship management (CRM) database to register other records (e.g., email, contact, company) with CRM powered applications. This may be compared to other approaches including an external set of mappings or target consumer-specific CRM-processing code. The techniques described herein for registration patterns may power the CRM by using its storage and access capabilities and functions as a plug-in mechanism. This may further benefit the CRM because the registration elements may be created substantially similar to the way that a custom object may be created, which in turn may be slightly different from a non-custom object (e.g., core object). In some embodiments, differences between creating a custom object and a non-custom object may include who may be allowed to do it (e.g., user-based determination), and for example, what set of permissions a user may have, otherwise it may be substantively a similar technical process. The systems and processes of registration patterns described herein may facilitate in creating a registration element which in turn may enable at least one of a custom object or even a standard object to interact with an application. A characteristic of the registration pattern may be that it may be used for a range of CRM objects, standard objects, and/or custom objects to provide CRM object content to a specific application feature. In some embodiments, a registration structure itself may not be a CRM object such that the registration structure may be stored in a home database. In some embodiments, the registration structure may be a CRM object itself. In some embodiments, there may be distinct registration elements for the standard objects and registration elements for the custom objects. In some embodiments, these objects may be stored in the CRM. In some embodiments, these objects may be portal specific and may be replicated across one or more of the portals.

In some embodiments, a registration pattern may include a registration definition element that may be stored in a database, such as a CRM database. A registration definition element (also referred to herein as a registration definition) may allow pre-existing objects of the CRM (e.g., custom objects, core objects, object types, etc.) to be adapted for new uses and consumed by processes (e.g., onboarding a CRM asset to a project/application) without any of the following: (i) forcing use and/or processing constraints to require altering the pre-existing objects; (ii) requiring new code to be written and/or existing code to be modified for such use; and (iii) needing to maintain use-specific shadow objects in the CRM (e.g., that may contain at least a portion of the object being shadowed in a use-specific format). A registration definition may be configured to ensure that content from a CRM asset may meet consumer application-specific (e.g., a CRM-powered application, such as a calendar) requirements for content, format, etc. In this way, registration patterns may facilitate reduced computational resources, reduced data storage resources, and reduced network activity when onboarding new assets or when changing behaviors of assets already on-boarded to (e.g., used by) a project/application. In an example, registration definitions may allow a pre-existing CRM object (e.g., webinar object, seminar object, etc.) to be processed for display by a calendar application, even when the pre-existing CRM object may include structures, formats, content, etc. that may not be fully compliant with calendar application input or use data requirements. Each type of project/application that consumes CRM data may be associated with a registration definition that may be specific to the project/application. This association may be one-to-one, with each project having a one-to-one association to a specific registration definition element in the CRM. This association may be one-to-many, optionally based on, for example, a type of project. In an example of a one-to-many relationship, there may be several instances of a project type "calendar" that may all share a single registration definition element.

In some embodiments, a registration definition element that may be associated with a target project/application may include registration definition element instances (e.g., discrete portions of the registration definition element) for several types of CRM objects (e.g., seminar objects, webinar objects, blog posts, emails, campaign elements, etc.). A registration definition element instance may be seen as a configuration read by a project when handling a specific object type. In some embodiments, a registration element instance may identify a set of criteria for CRM-sourced content to be consumed by, for example, a CRM-powered application. While this set of criteria may be consistent within the consuming application for at least a subset of all object types in the CRM, different object types in the CRM may store the consuming application's required information differently (e.g., may use different field names, may store the content in different formats, etc.). Therefore, while the required content may be consistent, a pattern by which information from the different types of objects may be registered may be different, resulting in, for example, source object dependent registration patterns.

In some embodiments, a registration pattern may include a registration association element that may be stored in the database. A registration association element (may also be referred to herein as a registration association or in certain contexts an association) may be a variant of a registration pattern that allows establishing and/or maintaining continuity of content and/or structure of related pre-existing objects. This registration pattern variant may facilitate CRM database continuity through identifying objects and one or more fields therein to be monitored for change. In some embodiments, a registration association element may be employed with a process for monitoring a CRM event stream (e.g., a log of events and/or active event stream) to facilitate detecting changes to objects in the CRM. A CRM event stream may include a CRM event (e.g., a change to a value in an object in the CRM) that matches at least a portion of content of a registration association may signify a change in the CRM that triggers a monitoring application to cause further CRM events to occur to ensure continuity in the CRM. As an example of maintaining continuity through use of a registration association element, an object type of "blog" may include a "source" field label that may be used by CRM-powered applications (e.g., ad campaign administration). A registration association element may be configured with this object type and this field label. Responsive to a CRM event monitoring application detecting a CRM event (e.g., in an event stream) that matches this registration association element, the monitoring application may cause other instances of the "blog" type object to be updated based on a change in the monitored field "source". Use of registration associations when monitoring CRM events may facilitate factor-based CRM reporting (e.g., CRM analytics) across a CRM (and the like)-based multi-service business platform.

In some embodiments, the methods and systems of registration pattern creation, configuration, use, and adaptation described herein may be further enabled through features of a host CRM, such as CRM-specific application programming interfaces (APIs). One or more CRM-specific APIs may facilitate uniform execution of read and/or write operations on objects in the CRM independently of a type of the objects. In some embodiments, use of such APIs with the methods and systems of registration patterns described herein may facilitate dynamically enabling use of several CRM object types for a specific use case (e.g., a CRM project, CRM-powered application, etc., some of which are described herein) using unmodified use case software/code. Further such us of the APIs may avoid redeployment and/or modification of software/code, CRM-specific data structures, etc. Benefits of such CRM-specific API functionality may include, among other things: (i) improved performance when using the CRM as compared to services that require such modification/adaptation; (ii) efficient CRM-independence of use case/user/service; (iii) efficient reuse of existing code thereby reducing the amount of use case-specific code to be maintained; and (iv) uniformity and consistency of CRM object structures, interface methods, and codebase that results in easier platform maintenance, debugging, and general understanding thereof.

Registration patterns (definitions and/or associations) may be established based on a range of factors and aspects of the CRM as well as consuming applications/processes. In some embodiments, when a new object type is defined in the CRM, such as a transaction-type object, one or more transaction type object registration definitions may be configured in the CRM. In some embodiments, a transaction type object registration definition may be created in the CRM for each consuming application so that each consuming application may seamlessly use/process the new object type by referring to its transaction type object registration definition. Further in this example, one or more registration associations may be defined and stored in the CRM to facilitate monitoring CRM event activity and maintaining continuity within the CRM for events that may impact the transaction-type object. In another example, when a new consuming application (e.g., a compliance application) is to initiate access to the CRM, one or more compliance application-specific registration definitions (e.g., one for each type of object present in the CRM contemporaneous with the compliance application initiating access) may be created and stored in the CRM.

In some embodiments, registration patterns may adhere at least in part to requirements of other objects in the CRM, such as use of syntax, taxonomy, structural elements like field definitions, etc. In this regard, registration patterns may be defined, instantiated, and maintained in the CRM through one or more pre-existing interfaces, portals, applications, wizards, etc. through which objects, object types may be defined, instantiated, and maintained in the CRM. Use of preexisting interfaces, tools, etc. may reduce complexity of a multi-service business platform, may reduce training time, may increase the likelihood that registration patterns may be adopted by users of the multi-service business platform, etc.

Registration patterns may be configured with a range of functionality including mapping source object field values to consuming application fields, reformatting source object field values to conform with consuming application formatting needs, establishing and/or signaling use of default values for consuming application data that may not be provided by a source object, indicating whether an object type may be used (activated) or may not be used (deactivated) by the consuming application, etc. Further, records (e.g., registration definition elements) may be created in the CRM to register other records (e.g., email objects, contact objects, etc.) with, for example CRM-powered applications. In this way, and optionally when combined with CRM-specific APIs, a registration pattern-enabled CRM may self-adapt for a wide variety of uses without, among other things, external sets of mappings of source object content to consumer (e.g., application) content or CRM-specific access code created content for and/or associated with each individual use case/application. In some embodiments, a registration pattern-enabled CRM may facilitate mapping attributes of source objects to specific fields required by any application that accesses (e.g., reads or writes) the CRM. Therefore, not only may the CRM be constructed and operated optimally for meeting requirements of a hosting multi-service business platform, but the CRM may be made accessible to external services by merely creating registration patterns for the external service.

By storing the registration patterns as object/elements in the CRM, the CRM may become its own configuration and adjustment mechanism. This enables independence of the CRM so that there may be no other system, no other interfaces, and no need for any system, application, third-party, or the like knowing about the details of objects in the CRM. Each registration pattern that is created for each object (e.g., object type) may hold the details about how to use the information in the object in the CRM to satisfy the system/application/third-party information requirements.

Registration Definition Process

In some embodiments, a registration pattern map may attribute properties of the source object (e.g., Email Sent Date) to generic fields required by the application to which the source object data may be applied/used (e.g., start date for an event in the calendar). This pattern may be used with different applications/systems (e.g., calendar system and/or campaign system).

In some embodiments, creating registration patterns and some custom objects may be accomplished through the same process and the same portal, such as the same form filling API used for custom objects. In some embodiments, it may be the same API, even though the logic performed by the API (e.g., in the background) may change. However, a standard object may be stored with a different data server than a custom object or registration pattern, due at least in part different freight limiting and other aspects that may not be needed for custom objects. In some embodiments, when trying to register a custom object, the system may execute logic for custom objects. When trying to create standard objects, the system may execute logic required for the standard objects. However, the interface (e.g., representation of the registration element to the user) may be the same. In some embodiments, the system may store the same kind of information for both of these (e.g., registration elements and custom objects).

In some embodiments, a registration pattern (e.g., registration definition element, registration association element, etc.) may be configured through a process that may include several actions. One such action may include identifying a target consumer application/user/project of information stored in objects in the CRM. Another such action may include identifying content types that may be required for use by the target consumer application/user, such as dates, links, etc. An example target consumer of CRM object information may include CRM-powered applications, such as a calendar application/service, a performance monitoring (e.g., analytics) application/service, an ingestion application/service, a CRM access application/service (e.g., CRM-access API), a data conversion service, a third-party application, etc. When one or more content types may be identified for the target consumer application/service, corresponding source fields for one or more (optionally all) types of CRM objects may be determined. As an example, a start_date field of a calendar application may require a particular source date content to ensure that the calendar application may populate aspects of the source objects from the CRM in the proper date. Information in a campaign-type object in the CRM may include several date fields (e.g., a date field that defines a trial period, a date field that defines when the campaign object was created, another date field for when a targeted advertising action of the campaign is to start, etc.). In some embodiments, a date field of the campaign-type object may be determined to correspond to the start_date field of the calendar application through use of automated and/or at least partially with manual activity. Date fields of other object types in the CRM may be determined to correspond to a start_date field of a calendar application. This process may be repeated for each target consumer application/user in combination with each object type defined in the CRM.

Registration Definition Creation and Use Processes

In some embodiments, a process to create a registration pattern, such as a registration definition may include identifying content types (e.g., dates, links, etc.) that may be required for a target consumer application/portal/user, such as a marketing calendar application, etc. The process may include, for each CRM object type, determining which source field may correspond to each of the identified content types. From this information, a CRM compatible object/element, such as a target consumer-specific registration definition that facilitates the correspondence may be arranged in a form that makes plain which source object and field corresponds to which target consumer content field. In some embodiments, a user may create such a registration pattern using the same user interface tool as may be used to create objects in the CRM. In some embodiments, the registration pattern (e.g., a registration definition) may be created and optionally arranged, as in JSON, to be stored in or in association with a database, such as the CRM database referenced herein. In some embodiments, the stored registration pattern may be identified (e.g., indexed in the CRM) by an identifier of the target consumer application.

In some embodiments, a process by which the registration definition created as described above, or otherwise created, copied, accessed, provided, or the like may be used and may include accessing the target consumer-specific registration definition. Based on object type properties of the retrieved registration definition, the system may receive/retrieve object(s) of the identified type from the CRM to be processed. In some embodiments, a record, optionally stored in or in association with the CRM (e.g., in an object processing tracking history), may identify object(s) of the CRM that may have already been processed. For each object of the identified object type accessed, the registration definition content (e.g., the map of object properties to target-user properties) may be used to map source object field values into target consumer-required fields. The resulting data may be used by the target consumer/application to perform its function, such as populate a calendar for rendering in a user interface, etc.

For a given target-consumer/source CRM object-type combination, a CRM compatible element (optionally an object of the CRM) (herein referred to as a registration definition element) may be created to facilitate use of the corresponding date information in the source CRM object-type. Information structured into a registration definition element may include source object type and corresponding field and target consumer application fields for several source object types, as represented in this example JSON script in FIG. 9.

A registration definition element may be created in a CRM database using tools, interfaces, and other existing object creation and maintenance functions that may be used to create CRM objects for the CRM database.

A registration definition element may be created for each target-consumer application/user. Each such registration definition element may include field correspondence statements for several different types of CRM objects. These field correspondence statements may be grouped within the registration definition element as a source-object type-specific registration element instance. As an example, a target-consumer application-specific registration definition element may include correspondences for date fields for an EMAIL object, a RECURRING EMAIL object, a CAMPAIGN object, etc. In this example, other field correspondences for an EMAIL object (for example) may be grouped in an EMAIL registration element instance within the target-consumer registration definition element.

In some embodiments, a target-consumer application/user may be configured to access and apply a registration definition element when attempting to access content of a source object in the CRM. The object type of the source object in the CRM being accessed by the target-consumer application may be used to identify a portion in the registration definition element that may facilitate mapping the relevant fields of the source object. The field mappings in the registration definition element may be used to map field values from source fields of the source object to corresponding fields of the target-consumer application/user. The mapped source field content may be used by the target-consumer application/user to perform a function, such as populate a calendar, transmit object data to a third party, perform analytics on the CRM, etc. In some embodiments, field mapping may be performed in batch mode with results of field mapping being stored in an intermediate CRM element that may be directly accessed by the target-consumer application. In other example embodiments, field mapping may be performed contemporaneously with execution of the target-consumer application. In some embodiments, an API may be configured as a registration definition element handling service, such as to retrieve data from the CRM, process the data per the registration definition element, and deliver the processed data to the target-consumer application.

Calendar Example Process with Registration Definitions

In some embodiments, a calendar application, such as a marketing calendar for use in managing a multi-service business platform may be CRM powered in that it may include a set of tasks for updating the calendar based on content of the CRM. An example calendar application may integrate different types of assets to be added to the calendar application. Examples include email campaigns that may be going out, sharing social media posts, entire campaigns, collections of assets, blog posts, etc. The methods and systems of registration patterns may facilitate bringing content in the CRM (e.g., in and associated with objects) to the calendar easily and quickly. Such a process may be referred to as a registration-activated calendar update that may be an extremely powerful CRM-application integration tool. Initially, a calendar application may request available object-specific registration definitions (e.g., distinct registration definitions for blog posts, landing pages, social media posts, etc.). In some embodiments, use of registration definitions (e.g., CRM registration definition) with the calendar application allows for the calendar application to integrate content of objects in the CRM associated with each of these registration definitions into the calendar (e.g., a blog post registration definition may enable integration of the properties of the blog post with the calendar.)

In this example of a calendar service, the calendar looks up its registration elements (e.g., looking for data such as name and/or what is being shown in the calendar). A registration definition may be useful when any application accesses a CRM database at least as a filtering mechanism that may be structured to facilitate restricting access to the CRM so that the requesting application is not shown (e.g., provided access to) content that may not be in the calendar. Further, a registration pattern definition may be useful for ensuring that content of properties of a source object may be determined for a minimum set of content required by the calendar application, such as the start date, which may be critical for rendering content on calendars. In some embodiments, these are the kinds of definitions may be part of a calendar registration definition.

As the calendar application loads, it may request from the CRM the registration elements identified as calendar registration definitions. For example, there may be a registration definition for blog posts, a registration definition for a landing page, a registration definition for social media posts, and so on. A start date of the blog post on the calendar may be a corresponding date field of the blog post objects. In addition to facilitating mapping object properties to calendar content fields, calendar rendering aspects, such as a preferred background color to be used when highlighting the blog post in the calendar may be a default highlight color field on the CRM object. As described herein in a range of example embodiments, a registration pattern may essentially be a set or collection of configurations and mappings from a pre-existing CRM object to what the calendar expects. A CRM access capability of the system may then know how to query for the CRM objects, and how to transform properties into a standard (e.g., compatible) representation for the calendar.

In some embodiments, a CRM access capability may be configured as an API end point that may, for example, fetch a list of blog posts CRM objects, and convert/deliver content of certain properties to the calendar based on the applicable registration definition. In some embodiments, CRM content fetched may include several JSON data structures representing blog posts objects in the CRM. Further the system may include an API to feed data from the registration-based CRM access API to the calendar. In summary, a process for creating a calendar event with the registration methods and systems described herein may include taking the list of objects from the CRM, and applying the configuration and rules in the registration definition to produce a standard calendar event. In some embodiments, applying a registration definition for populating a calendar may cause an impact on data structures of or associated with a calendar application that may populate the calendar. In some embodiments, a CRM object may include identified fields and/or field values that may be processed with a corresponding registration definition to generate and/or impact data structures, such as fields and/or values of a target CRM object (e.g., a calendar instance object), or configure and/or generate a CRM object that may be used by (e.g., accessed within the CRM) a calendar application for performing calendar functions, such as populating a calendar. In some embodiments, identified fields and/or field values of a target CRM object may be processed by a registration definition(s). A result of the processing may be provided to a calendar application, such as in a stream of calendar population values from which a calendar may be populated.

Further, in this calendar example, the list of registration patterns for the calendar may include a landing page. This registration element may be created in order to make sure that the landing page objects are properly rendered in the calendar. In this example, there are many fields that embody the kind of information that a registration definition possesses for the calendar use, such as: the object ID, the name of the object, etc. The registration definition may answer questions for the calendar, such as what is the property that is keeping an ID for landing pages?; what is the property keeping track of the published date for the landing page objects?; and what is the property keeping track of the name of those objects? In some embodiments, this registration may facilitate fetching, from the CRM, the properties that may be needed in order to properly render landing page objects in the calendar.

In some embodiments, the methods and systems of registration patterns may provide flexibility for CRM operation because if key properties required by the calendar change, it may be possible that all the landing pages may not be rendered by the calendar anymore. The CRM may be updated to cause a change in how to store the start date in landing page objects. To accommodate such changes for all objects, only the registrations may need to change. In some embodiments, a seed registration may have a dynamic configuration that may be updated (e.g., by developers) in order to ensure that some changes in the CRM may be reflected in the calendar or in general, in the example use case that uses the registration pattern.

In some embodiments, registration definitions may be standardized across portals so that no matter what portal is accessing the CRM, the view may be consistent for the corresponding object types. However, custom registration definitions (e.g., created for customer objects) may provide customers with registration definition-level control over use of customer objects. In some embodiments, a customer may define and configure a home webinar object in the CRM. These custom webinar objects may be shown in the calendar by use of a custom webinar object-specific registration element instance being configured, optionally by the customer, using the methods and systems of registration definition creation herein. In some embodiments, the methods and systems of registration patterns may be adapted to allow specific portals (e.g., customers) to create registrations for their home custom objects. In some embodiments, integration of object content into a calendar and/or into a structure to be reported, may be controlled on a user-specific basis through use of custom objects and custom registration definitions for those objects.

Fields within the registration definition may provide various configurations and mappings that may be executed by the calendar system (e.g., start date field, preferred background color field, etc. in the blog post registration element). In the calendar use case, a minimal set of corresponding fields in the CRM object may be required, which in this case may include the start date, property, and the title property, and optionally the object ID property. If a CRM object type has at least these properties, the CRM object type may be registered for (integrated into/with) the calendar. As an example, if a first object type does not have a title property, then it may not be possible to show the first object type in the calendar. As noted herein, not all target consuming applications/portals/users may require the same source object properties. For example, campaign applications may not require all of the property fields that a calendar application may require. In an example of integrating a marketing email object with a calendar, different properties may be required for the marketing email to be properly shown in calendar. In some embodiments, other properties may not be mandatory. However, some non-mandatory properties may enable some calendar features, such as object preview. Therefore, if a preview property is configured in a marketing email object, the calendar UI may provide user access to the preview key as well.

In some embodiments, comparable properties on different object types may be given the same identifier (e.g., object ID), although that may not be required. A first object may define the ID property with one name, but another object may define the ID property with a different name. The methods and systems of registration patterns may allow two different properties in two different objects to have the same name, while ensuring that each is mapped properly when each object is processed by its corresponding registration definition (e.g., for use by an application such as the calendar application).

In some embodiments, query registration definitions may be transformed into standard representations for a calendar application. Example embodiments may include using a calendar system to look up registration definitions (e.g., look for data properties such as name and/or what is shown in the calendar including start date). In some embodiments, registration definition required fields may include primary ID, definition name, definition type, properties such as start date, etc. for use with the calendar system.

In some embodiments, an API may be configured for use as an interface between an application (e.g., calendar) and the CRM. An example may include an API used to fetch registration definitions (e.g., blog posts CRM objects which may be JSON representing blog posts objects in the CRM). This example may include an API that may feed data from the CRM to be transformed and formatted for an application (e.g., calendar application). This example may include a list of registration definitions from a CRM that may include configurations and rules that may be applied as part of obtaining a standard calendar event (e.g., feed of data pre-transformation and post-transformation for each registration definition).

In some embodiments, there may be a level of common functionality to registration patterns that may be applied across objects, applications, and CRM elements in general.

In some embodiments, an application may feed off data from the CRM. A registration pattern may be keyed to one of several types of objects. In some embodiments, a registration pattern may have a set of data that may apply to any use of the registration pattern. Also, a registration pattern for a calendar application may define a set of "must have" fields such as start date as described herein. This may be an example of a data item in the set of data that, while it may apply to any use of the registration pattern, may be accompanied by application-specific transformation and configuration data.

In some embodiments, a calendar application use of registration patterns is provided. Prior to use of a registration pattern by a marketing calendar application to render events on the calendar of different object/asset types, the application may fetch the relevant data from several objects in the CRM. In this example, the CRM may be a multi-service business platform CRM database that may include different types of CRM objects for several platform users. The calendar application may seek to render select assets for the users in one calendar view. Therefore, the calendar application may retrieve CRM object content from a range of asset types and user-specific objects and render the respective calendar events accordingly. For some examples, in addition to needing to discern specific portions of different types of assets for a single user, having to deal with several users may require a substantive amount of code development and maintenance that may cause a negative impact on the platform codebase, on the platform metrics, and on the overall platform performance. Further, in some examples, a lack of homogeneity may make onboarding new assets to the calendar tedious and error prone as more and more complexity may be added to the calendar application codebase. This greater complexity may contribute to overall platform performance degradation in some examples.

Use of the methods and systems of registration patterns may resolve and/or eliminate these complications, performance cost, and complexity. The example calendar application (and generally most such applications that access a CRM) may use fetching logic of the CRM. That fetching logic complexity may be reduced so that a single fetching logic (e.g., program code) may be used to fetch content from all different types of CRM objects or assets for all different user objects stored in the CRM. Typical operational activity of the platform, such as onboarding a new asset to the calendar (e.g., rendering a newly created campaign in the calendar) has been turned from a tedious error-prone process that may result in impacting rendering of other assets into a simple registration definition creation process using CRM-object creation tools. This improvement may be further exemplified by each registration element instance in a registration definition element being responsible for onboarding of a specific asset type. The registration element instance may contain at least a mapping of properties on the CRM object to fields on a common calendar event object. Prior to use of registration patterns, the mappings between specific assets and calendar events (e.g., between CRM object fields and calendar object fields) were statically coded for each asset. This required having several entities responsible for onboarding each individual asset type to be rendered in the calendar. With the use of registration patterns, a single entity may be configured to receive a registration element instance with a corresponding CRM object and deliver a conforming calendar event data set that may be rendered by the calendar application.

Figure 9:
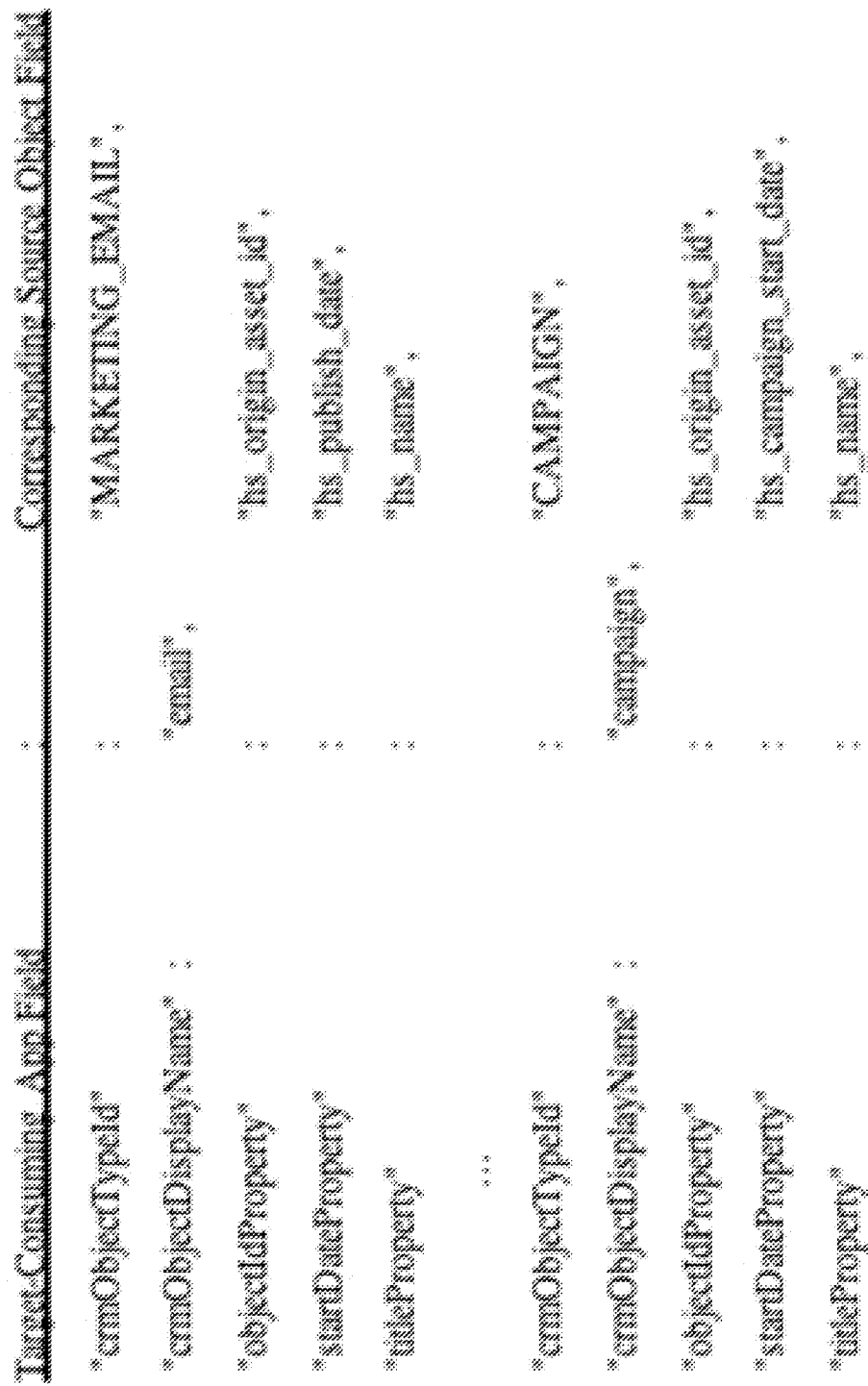
FIG. 9 is an example of a registration definition for a target-consuming system and corresponding source object field mappings, according to one or more embodiments of the disclosure.

Further, in this registration pattern example for use by a calendar application, a calendar application may request registration definition element(s) configured to facilitate onboarding of calendar events based on select object (types/assets) in the CRM, such as blog posts, landing pages, social media posts, etc. A CRM-interface portion of the calendar application, or optionally a CRM-interface service of the CRM such as a CRM-specific API, may use the information that identifies each registration element instance in each registration definition element to identify assets in the CRM to be accessed. In some embodiments, a calendar application may target a specific CRM asset when requesting the registration definition element(s), such as when a user may adjust a view of the calendar to include an asset not currently rendered in the calendar. Content of the targeted assets may be retrieved and values from fields identified in a corresponding registration element instance may be selected and configured for delivery to the calendar application. Configuring these selected values may include generating a data set that attributes each selected value to a specific field/attribute of the calendar application. In the example of FIG. 9, a value of the CAMPAIGN asset field "hs_campaign_start_date" for a selected CRM asset may be attributed to the calendar required field "startDateProperty". The calendar then may use this value to render the CAMPAIGN asset on the proper date in the calendar.

FIG. 10 provides an example of a registration definition element instance for rendering a MARKETING_EMAIL asset with a Calendar application. The left column indicates the required calendar function attribute fields to be populated for rendering the asset. The right column indicates the field in the MARKETING_EMAIL asset from which a value for the corresponding calendar function attribute field may be obtained.

Further, in the example of FIG. 10, the MARKETING_E-MAIL registration definition element instance may be enabled for use by the calendar or disabled for use. The value in the registration definition element instance entry labeled "isEnabled" may be used for such a purpose. When the entry labelled "isEnabled" given a value of "true" as depicted in FIG. 10, then the calendar application may render CRM objects of the type "MARKETING_EMAIL". If the same entry value was not "true" (e.g., "false"), then the calendar application may not render CRM objects of the type "MARKETING_EMAIL".

In some embodiments, registration definitions may facilitate distinguishing between two different variants of an object type. In the example of FIG. 10, the specific variant of object type "MARKETING_EMAIL" to which this registration definition applies may be an "email" variant as determined by the "crmObjectDisplayName" field. In this way, rendering of other variants of "MARKETING_E-MAIL" by the calendar application may be separately controlled.

Further, in the example of FIG. 10, the calendar field "gateName" may be configured for each registration definition element instance. Use of this field may further determine conditions under which the registration definition element instance may be utilized. When this field is "null", as is the case in FIG. 10, the registration definition element instance may be used without further gating. However, when this field is not "null", conditions associated with the "gateName" specified may be considered when determining if and how this registration definition element instance is to be used.

In some embodiments, a flow of data may be envisioned as a source stream originating at the corresponding fields in the source object, through a function that applies the registration instance mapping(s), and to a target stream that is ingested by the calendar application for rendering therein.

In some embodiments, example core objects (e.g., object types) that a calendar application (or other application) may process through the methods and systems of registration patterns described herein may include, without limitation: publishing_task/task, marketing_email/email, marketing_email/recurring-email, social_broadcast/social, ad_campaign/social network ad campaign, ad_campaign/google ad campaign, blog_post/blog-post, marketing_event/marketing event, ad_group/social network ad group, site_page/site-page, landing_page/landing-page, campaign/campaign, etc.

A user interface is provided through which registration definitions for a calendar application may be selected for onboarding a corresponding CRM asset/object. The highlighted drop-down list may be used to select one or more asset types to be rendered in the calendar. Selection (e.g., checking a corresponding checkbox in the drop-down list) may cause a CRM fetching service to access a corresponding registration instance within a registration definition element for the calendar application. In the example of, all of the available event types may be selected. For the remainder of this example, the event type such as a social network ad group (SNAG) is referenced. In some embodiments, the CRM fetching service may access corresponding registration instances for SNAG event type. In some embodiments, the fetching service (or the like) may proceed to retrieve data from each SNAG object in the CRM, apply the registration instance mappings for a SNAG object type, and deliver the resulting content to the calendar application. The result may include one or more lead generation ads rendered on the calendar. The processes described in this example may leave the source object(s) (e.g., all SNAG-type objects) in the CRM database unchanged, while ensuring that each may be properly rendered in the calendar.

Registration Patterns—Associations Embodiments

In some embodiments, registration patterns may include a variant referred to herein as registration associations. Registration associations may facilitate, among other things, maintaining consistency across objects within a multi-service business platform database, such as a customer relationship management (CRM) database. Registration associations may facilitate adding new associations among objects and/or updating existing associations based on actions on or within the CRM. In some embodiments, existing associations may be cleared/removed or updated for maintaining consistency.

In some embodiments, registration associations may define one to one associations (among assets of the platform, such as objects of the platform) and one to many associations. In some embodiments, registration association type patterns may allow associating an object with a different type of object, such as to a campaign. The example of one to one or one to many association may include associating one blog post to one campaign in a one to one registration association relationship. In an example of changing a one-to-one relationship association, if a blog post, e.g., "the best blog post ever" is associated to a first campaign, an association status for this blog post may show that it is currently part of (e.g., associated with) this campaign. If that blog post association is changed, such as by attempting to associate it to a second campaign, through application of the methods and systems of registration association described herein, it may be removed from the first campaign because, in this example, one blog post may only be part of one campaign.

In some embodiments, an example of a many to many asset association may include association of a workflow. In this example, a user (or system process or other automated process) may add a first workflow to a first campaign. If one were to add the first workflow to a second campaign, the system may accept this second association of the first workflow without removing it from the first campaign because, in this example, one workflow may be part of multiple campaigns. In some embodiments, a control for whether or not an asset may be used in a one-to-many association may optionally be indicated by an association definition index value recorded in the registration association data structure. In an example of a registration data structure that uses a JSON syntax, this value may be retrieved from an "association ID" property of the registration association data structure.

In some embodiments, a value of an "association ID" may be used by the system to retrieve a related data structure (optionally referred to as a definition of the registration association) that may provide greater/other details of a registration instance. This related data structure may include information that determines if the asset type to which this registration instance applies (e.g., is identified in a "toObjectType" property of the instance) may be used in a one-to-many relationship.

Figure 11:
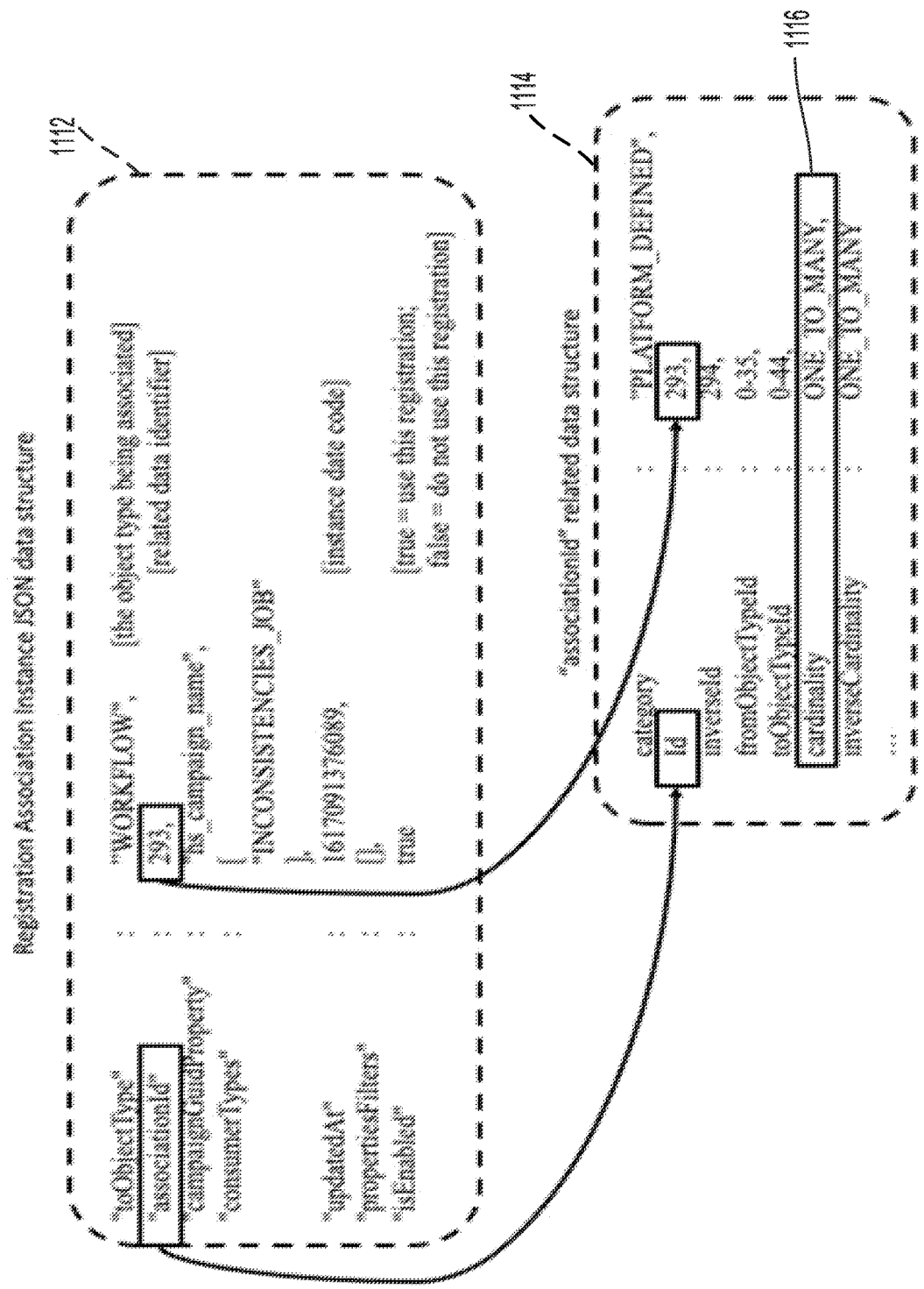
FIG. 11 is an example diagram depicting a JavaScript Object Notation (JSON)-based registration association data structure and a related data structure providing details of association cardinality, according to one or more embodiments of the disclosure.

FIG. 11 depicts JSON script for a registration association and its related definition data structure(s). A registration association data structure instance 1112 may include an "associationId" with a value "293". The "associationId" may be mapped with one or more functions of the platform to an "Id" field of definition data structure 1114. In some embodiments, the platform may include such definition data structures. In the example of FIG. 11, "associationId" value "293" may be found in a corresponding "Id" field. A determination of whether objects to which registration association element instance 1112 applies may be associated through a ONE-TO-ONE or a ONE-TO-MANY arrangement is based on a value of a "cardinality" property of the definition data structure 1114. In this example, asset object type "WORKFLOW" (to which registration association element instance 1112 applies) may be arranged in a ONE-TO-MANY association relationship based on cardinality 1116 value.

In addition to handling asset association relationship modes (one-to-one and one-to-many), the association variants of registration patterns herein may be used by a CRM activity monitoring service of the platform that may be utilized to process updates to objects for consistency across the platform (e.g., updating of associations such as a blog post belongs to a particular campaign, or the particular campaign has a blog post). In some embodiments, a worker system may monitor for changes in the CRM (e.g., changes to registration definitions, campaigns, etc. that may require changes to associations). The registration association information from several object type-specific registration association element instances may be used (e.g., by the worker system) in determining specific changes (e.g., type of object, properties, and/or associations of the object) that may be required for consistency. In some embodiments, the worker system may query a source of data that may include changes to one or more objects (e.g., a CRM ingestion/activity stream and/or log) for activity associated with an object type defined in one of several registration association element instances being used by the worker system to determine if certain properties have changes (e.g., value present in property may have changed). If CRM change activity matches the information in the registration association being used by the worker system, one or more objects (e.g., campaign objects) may need to be changed based on that property change (e.g., property change may be moving of blog post from one campaign to another campaign).

In some embodiments, managing campaigns in a CRM may rely on registration definitions to facilitate processing what may be complex multi-object updates (e.g., process updates to objects to ensure associations and related aspects of a campaign stay consistent). In some embodiments, an "association" action may be based on a "registration association" as described herein that may be substantively equivalent to a database "join" operation. For example, to achieve consistency so that there is no doubt when accessing the CRM that "this blog post" belongs to this campaign, and this campaign has "this blog post" in it, registration associations that relate "this blog post" with this campaign may be used.

A worker system (e.g., a platform service) may use registration elements as the worker system listens to a stream of change events in the CRM. Worker system may also be referred to as worker service. For each event, the worker system may monitor changes to one or more object values defined by a registration association for the object type identified in the event to determine among other things how the CRM may have changed, such as how a campaign associated with the object type identified in the event may have changed. If the campaign has changed, the worker system or service may attempt to update all the associations of the campaign and keep the CRM consistent. In particular, a registration element used by that worker service may identify a type of object and what fields of the object may be monitored for changes in the event stream. Based on changes in that field, the worker system may determine which associations should be updated, which ones should be cleared out, which new ones should be created, etc. In some embodiments, the worker service or system may perform these association consistency updates independent of the object being a custom object or a standard core object. In some embodiments, how a registration element is structured (e.g., the property that it checks for) may change for each different application/use.

In some embodiments, one may use the registration associations for doing associations of assets with the campaign. In some embodiments, a registration may include a set of definitions for processing items. For example, an example registration may facilitate a worker service in determining if, in the CRM, any object of the type "automation platform flow" changes, and if a property (e.g., campaign GUID property "hs_campaign_guids") specifically changes, then the value which may be present in the change event for that property may be associated with the object that has been changed. For example, an object of type "automation platform flow" that has changed may be considered. The value of a property may have changed (e.g., campaign GUID score changed). In some embodiments, the worker service may automatically do the association of the "automation platform flow" (which has changed) with the corresponding campaign. This example of registration patterns relates to managing of associations between objects in the CRM. A type of registration association data structure for use by a worker service may include only a few sets of fields such as fields relating to object type being monitored and the field being monitored.

The worker service may use this registration element to find a type of object in the CRM (e.g., "automation platform flow") with a specific property (e.g., "hs_campaign_guids"). When the worker service finds the object of the type "automation platform flow" in the CRM, the worker service may attempt to find whether the "hs_campaign_guids" property has changed based on what is found in the CRM and what is provided in the CRM change event stream. If this property has changed, then a campaign identified by this "hs_campaign_guids" campaign value may have this "automation platform flow" associated with it. In some embodiments, the worker system, which does this monitoring for any changes in the CRM, may monitor everything that is changing in the CRM using filters that may be based on the registrations, and then may do the work of associating assets in the CRM based on what has been configured in the registration association.

In some embodiments, there may be several applications that move assets in and out of campaigns. It may require monitoring and possible adjustment of the code of these applications such as making changes to keep the associations straight and up-to-date. In other example embodiments, the CRM may emit a constant stream of events. Every time anything changes such as a definition, an object, or an object instance, there may be an event in that stream. The worker service that uses registration associations may be monitoring the stream for all of these changes. For example, if a user took a blog post and moved it from a first campaign to a second campaign, that change may generate an event in the stream. The worker service may monitor (e.g., listen) for such an event and determine that the blog post had its campaign field updated to reflect the second campaign. The worker service may check the second campaign object (that may be defined in the updated campaign field in the blog post change event) and may make sure that the second campaign object reflects the new campaign assignment. In some embodiments, such a worker service or system may be a CRM internal tool to keep the associations between objects in the CRM up-to-date. Rather than changing the database in some examples, this worker system or service may be adjusting the association (e.g., changing the graph data). In some embodiments, applications may be changing the database and may also be updating at least portions of the CRM. This registration association-based worker service/system may monitor the portion of the CRM that may be changed to determine what else in the CRM may be impacted by the change, thereby centrally implementing the change across the CRM for objects and/or object types identified in the registration association employed by the worker service. This central implementation of CRM changes through use of registration associations may eliminate the need for requiring the change be made by every individual application that may make use of the CRM.

In some embodiments, registration patterns may include variations that may facilitate updating portions of the CRM based on monitored CRM events, such as activities of sources of changes to other portions of the CRM. In some embodiments, such a registration pattern variant may be a registration association that may be configured to facilitate identifying an object type and at least one field of that object type to be monitored. When a CRM activity monitoring service, that utilizes registration associations, detects an event of the CRM that identifies an object type noted in the utilized registration association, the content of the event (e.g., what the event is causing to be accomplished in the CRM to the object type) may be checked to determine if it impacts the field of the object type defined in the registration association. When the content of the event matches both the object type and the specific field identified in the registration association object, an association CRM activity may be activated.

In some embodiments, an association CRM activity may include making conforming changes to the specified field in other instances of the object designated in the registration association. As a non-limiting example, a registration association element may be configured as depicted in FIG. 11.

An activity monitoring service may monitor CRM activity based on the registration association element of FIG. 10. The activity monitoring service may look in the monitored activity for event content that may signify that an object type "LANDING_PAGE" is being targeted for some action (e.g., reading a value in the object, writing/updating a value of one or more fields in the object, etc. When the monitored event identifies the object type "LANDING_PAGE", the event may be further evaluated/monitored to determine if a specific field or fields of the object type are being acted upon by the event. In the example of FIG. 10, the registration association for the object type LANDING_PAGE indicates that actions taken in the event against object field "hs_campaign_name" are to be followed up for maintaining consistency in the CRM database. As a specific embodiment of the example of FIG. 10, when the event reflects that the object field "hs_campaign_name" is being/has been assigned a value (which is optionally the same as the current value or may be a different value than a current value), action may be taken within the CRM to ensure consistency as required based on the change.

In another example, a registration association element may identify a "blog post" field of a "campaign" object for monitoring by a CRM event activity monitoring service. When a CRM event matches this registration association element, a new value in the "blog post" field that may be defined in the event may be used to update portions of the CRM database for maintaining consistency. As another example, some (but not necessarily all) applications that have access to the CRM may be making changes that require updating the CRM. The activity monitoring service may use registration associations to determine if the change being made requires other changes in the CRM for consistency. Such an approach may reduce the burden on such applications of ensuring that CRM database consistency is maintained.

In yet another example of use of registration association elements, information in the registration association may facilitate identifying what the CRM consistency application may need to do when a specific field in a specific object type is acted upon. In some embodiments, a CRM activity event may detect where a value of an attribute in a CAMPAIGN object is changed in the CRM. There may be other CRMs that may be impacted by such a change. In some embodiments, a CRM consistency service may use the change of object information identified in the association registration to query the CRM for other (e.g., related) objects that rely on the now changed object field content. As the CRM consistency service finds other impacted objects, it may change them accordingly so that the now changed object content may be propagated to the other related objects.

In some embodiments, registration associations may be configured to facilitate monitoring CRM activity for a variety of object types including, without limitation, the following object types: landing_page/131, cta/141, blog_post/135, site_page/133, automation_patform_flow/293, ad_campaign/315, marketing_email/139, social_broadcast/305, etc.

Figure 12:
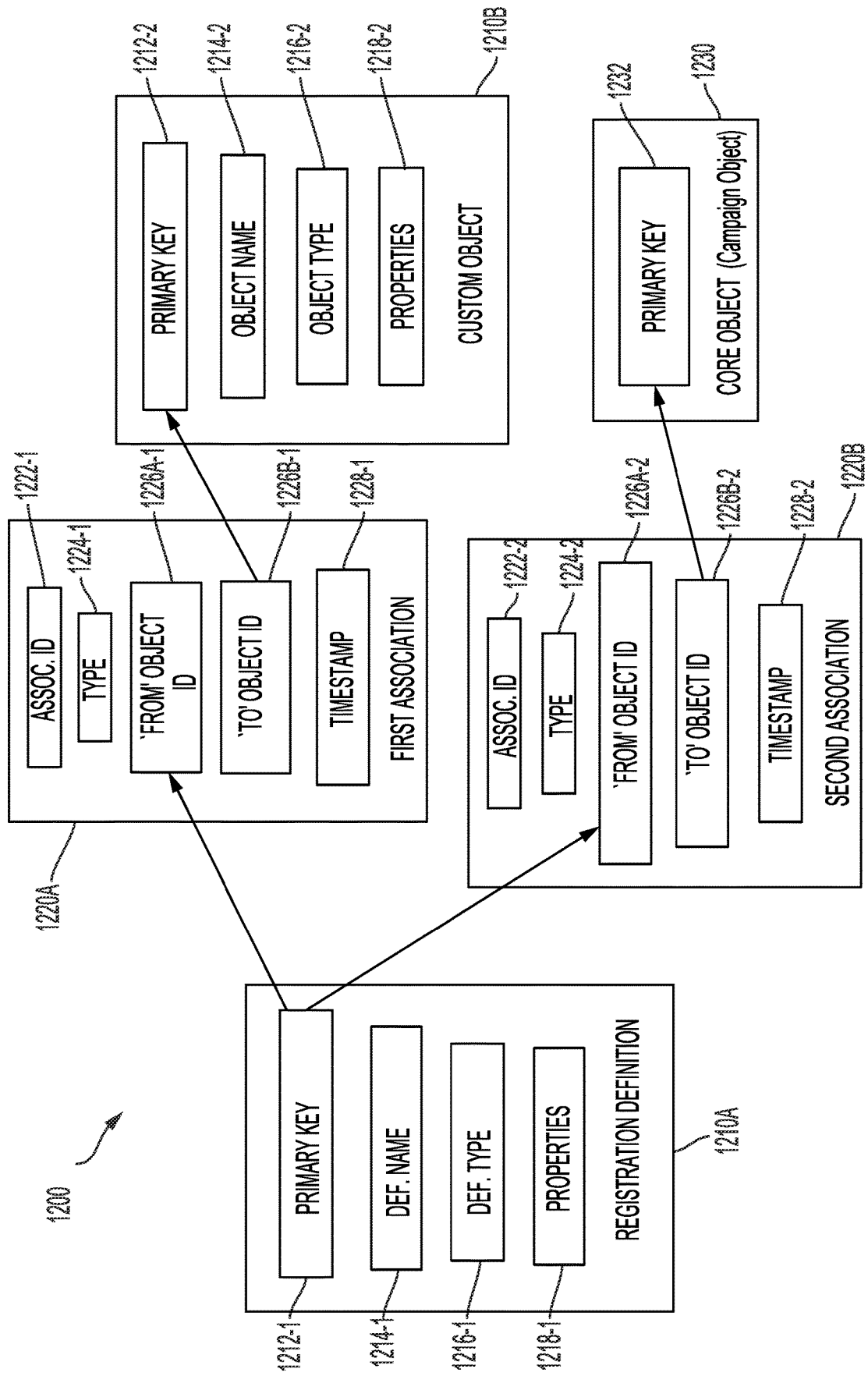
FIG. 12 is an example detailed view of a registration pattern with associations between a registration definition and other objects (e.g., custom objects and/or core objects), according to one or more embodiments of the disclosure.

Referring to FIG. 12, an example detailed view of a registration definition and associations embodied in a registration pattern or a defined relationship of the registration definition with other objects and associations 1200. The instance or relationship 1200 may include a registration element and associations between the registration element and other objects (e.g., custom objects and/or core objects) as depicted. Registration definition 1210A may include data fields that may be useful when applied in the registration pattern methods and systems described herein. Fields of registration definition 1210A may include a primary key field 1212-1 that may be used to identify related association data structures (e.g., 1220A or 1220B) based on a correspondence of the primary key field 1212-1 with a "from" object ID (e.g., 1226A-1 or 1226A-2) in related association data structures. A definition name 1214-1 and definition type 1216-1 may be included. Further, a set of properties 1218-1 of the registration definition 1210A may be useful for determining, for example, whether or not an instance of this registration data structure 1210A is enabled. In some embodiments, a registration definition (e.g., registration definition 1210A) may be related to one or more association data structures, such as first association 1220A and second association 1220B. In some embodiments, an association data structure may include several fields that may be referenced by the registration patterns' methods and systems described herein. Example fields may include an association ID field 1222-1/2, a type field 1224-1/2, a from object ID field 1226A-1/2, a to object ID field 1226B-1/2, and a timestamp field 1228-1/2. In the example embodiment of FIG. 12, the first association 1220A may be related to a custom object via the to object ID field 1226B-1, such as by the to object ID field 1226B-1 facilitating linking the first association data structure 1220A to a custom object 1210B. This linked custom object 1210B may include several fields including, without limitation, a primary key field 1212-2 that may facilitate linking the custom object 1210B to the first association 1220A, an object name field 1214-2, an object type filed 1216-2, and a set of object properties 1218-2. In some embodiments, the second association 1220B may be related to a core object 1230 (e.g., a campaign object) via the to object ID field 1226B-2 facilitating linking the second association data structure 1220B to a core object 1230. The linked core object 1230 may include at least one field such as a primary key field 1232 that may facilitate linking the core object 1230 to the second association 1220B.

Figure 13:
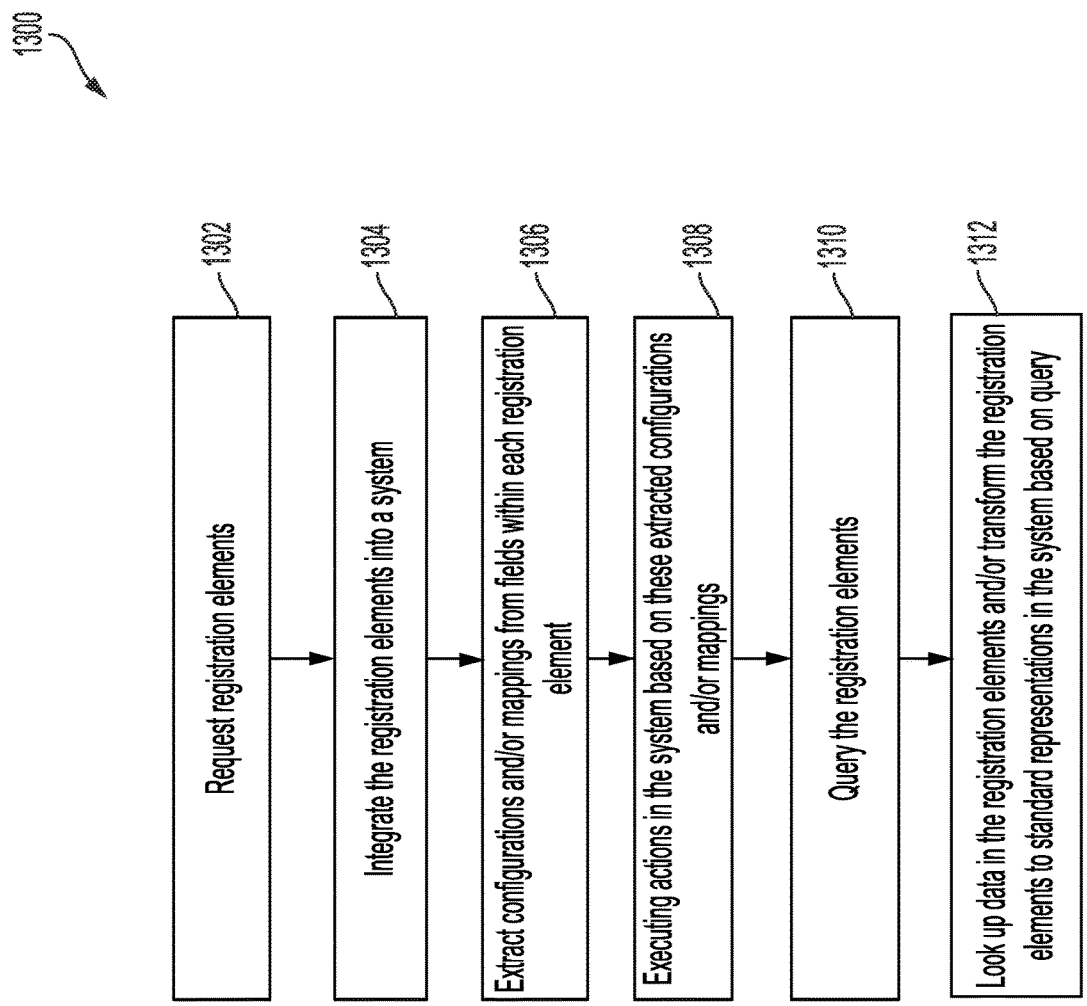
FIG. 13 is an example flow diagram for using registration patterns with a calendar system, according to one or more embodiments of the disclosure.

In some embodiments, FIG. 13 is a registration pattern use flow diagram 1300 of an example embodiment of use of registration patterns with a service (e.g., a calendar application, an activity feed service, an asset association service, a campaign management service, etc.). The flow diagram 1300 illustrates a set of operations for using the registration system 103 (and the registration definition service) with a service (e.g., calendar system of the services 530 of the multi-service business platform 510). At 1302, registration elements may be requested. At 1312, the registration elements may be integrated into the service and the registration elements may be used to integrate CRM object content into the service. At 1306, configurations and/or mappings may be extracted from fields within each registration element. At 1308, the service (e.g., calendar application) may execute one or more actions based on the extracted configurations and/or mappings. At 1310, registration elements and CRM objects to which the registration elements relate may be queried. At 1312, information in the queried objects may be looked up. Also, the information from the queried objects and/or the registration elements may be transformed based on information in the registration elements into standard representation content for rendering in the calendar based on the query.

Figure 14:
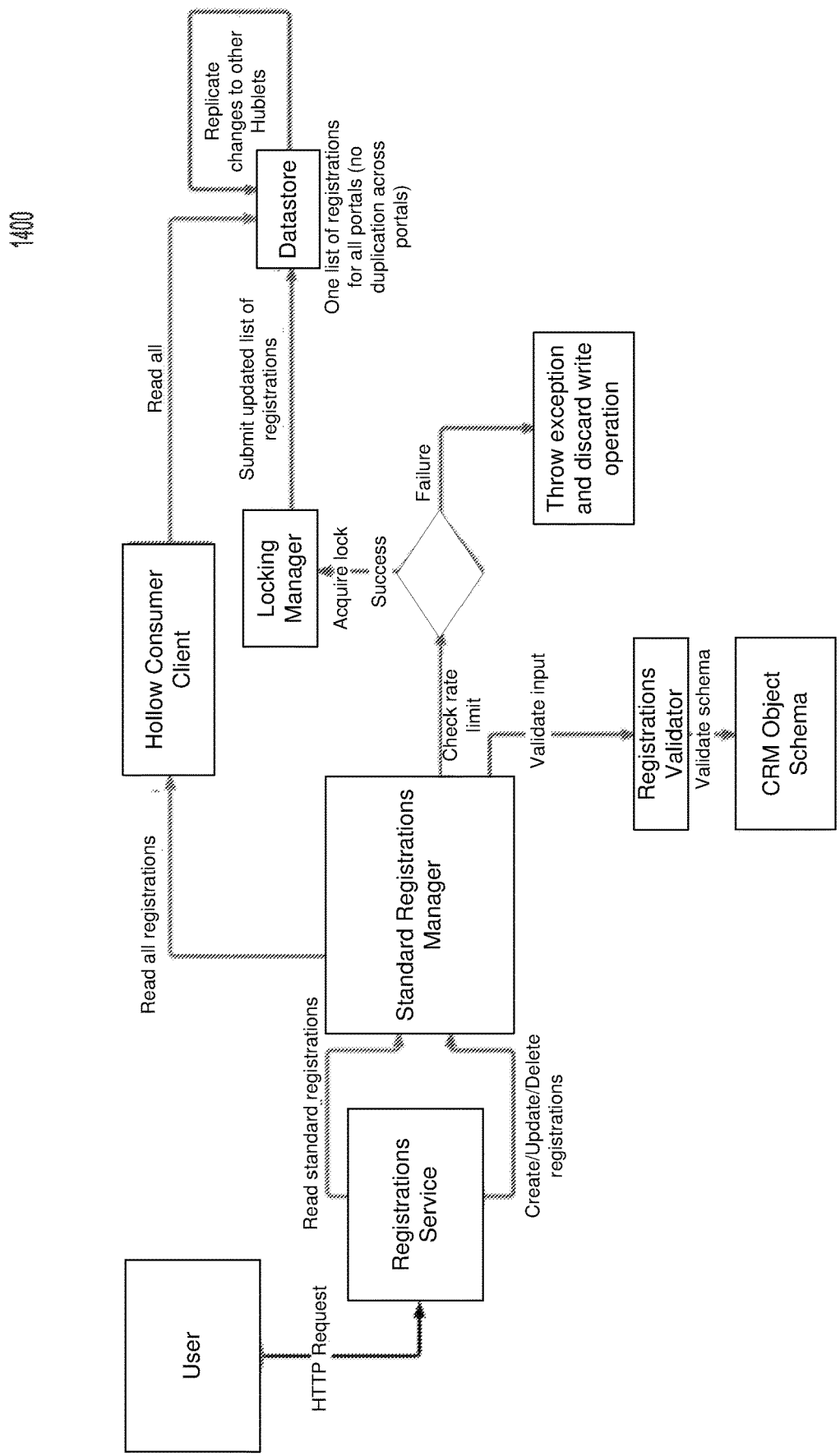
FIG. 14 is an example flow diagram for registering standard object types, according to one or more embodiments of the disclosure.

FIG. 14 is an example flow diagram 1400 for registering standard object types, according to one or more embodiments of the disclosure. A user device may submit an HTTP request to a registrations service that is configured to read standard registrations and create/update/delete registrations maintained by a standard registrations manager. The standard registrations manager validates input using a registrations validator that validates a schemed using a CRM object schema. The standard registrations manager checks a rate limit. If there is a failure, then an exception is thrown and a write operation is discarded. Otherwise, a lock is acquired from a locking manager, and an updated list of registrations is submitted to a data store. There is one list of registrations for all portals without replication across portals. Changes are replicated to other hublets. The standard registrations manager also reads registrations from the data store through a hollow consumer client component.

Figure 15:
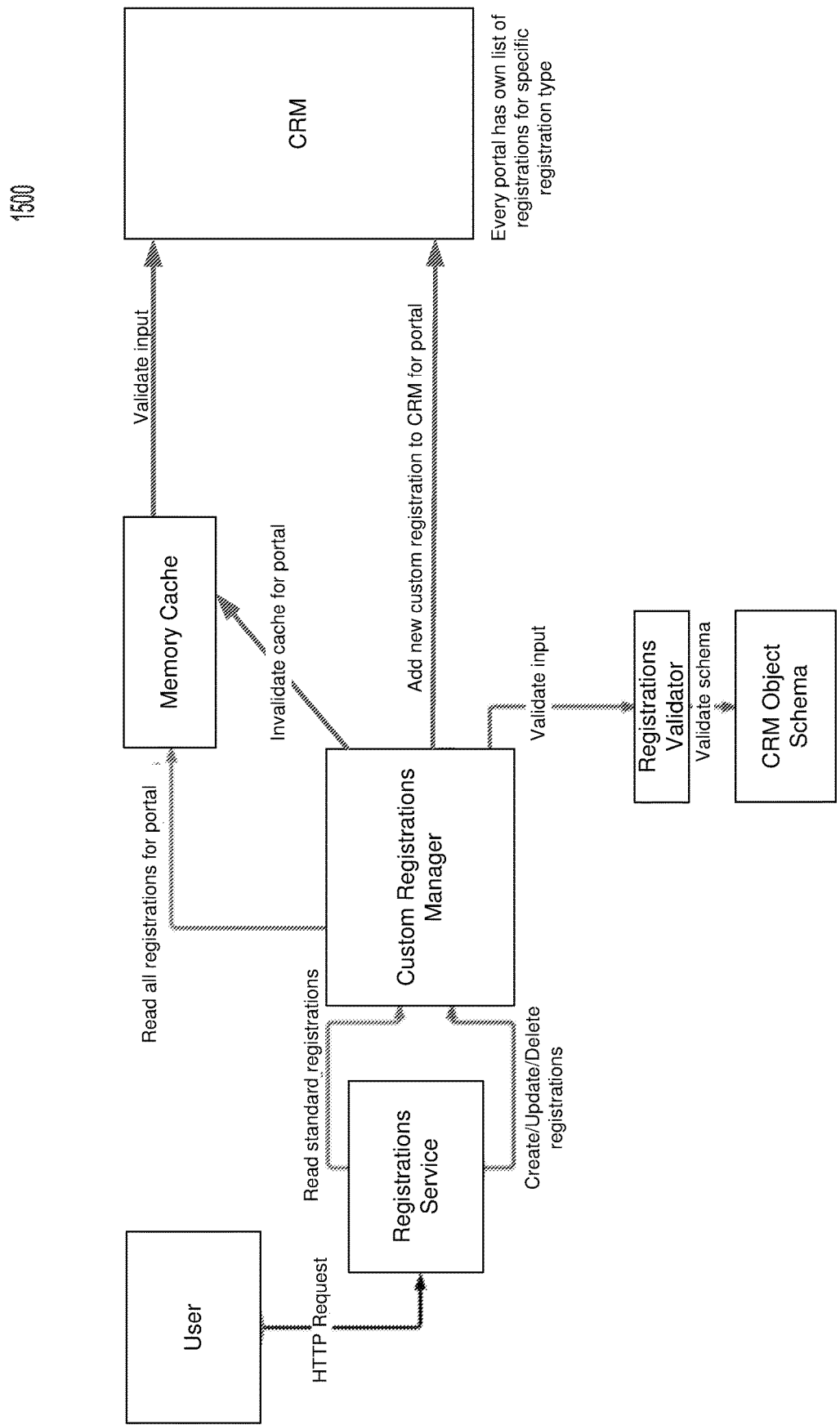
FIG. 15 is an example flow diagram for registering custom object types, according to one or more embodiments of the disclosure.

FIG. 15 is an example flow diagram 1500 for registering custom object types, according to one or more embodiments of the disclosure. A user device may submit an HTTP request to a registrations service that is configured to read standard registrations and create/update/delete registrations maintained by a custom registrations manager. The custom registrations manager validates input using a registrations validator that validates a schemed using a CRM object schema. The custom registrations manager reads all registrations for a portal through a memory cache that can validate input through a CRM. The custom registrations manager can invalidate cache for a portal. The custom registrations manager can add a new custom registration to the CRM for a portal. Every portal has its own list of registrations for a specific registration type.

Figure 16:
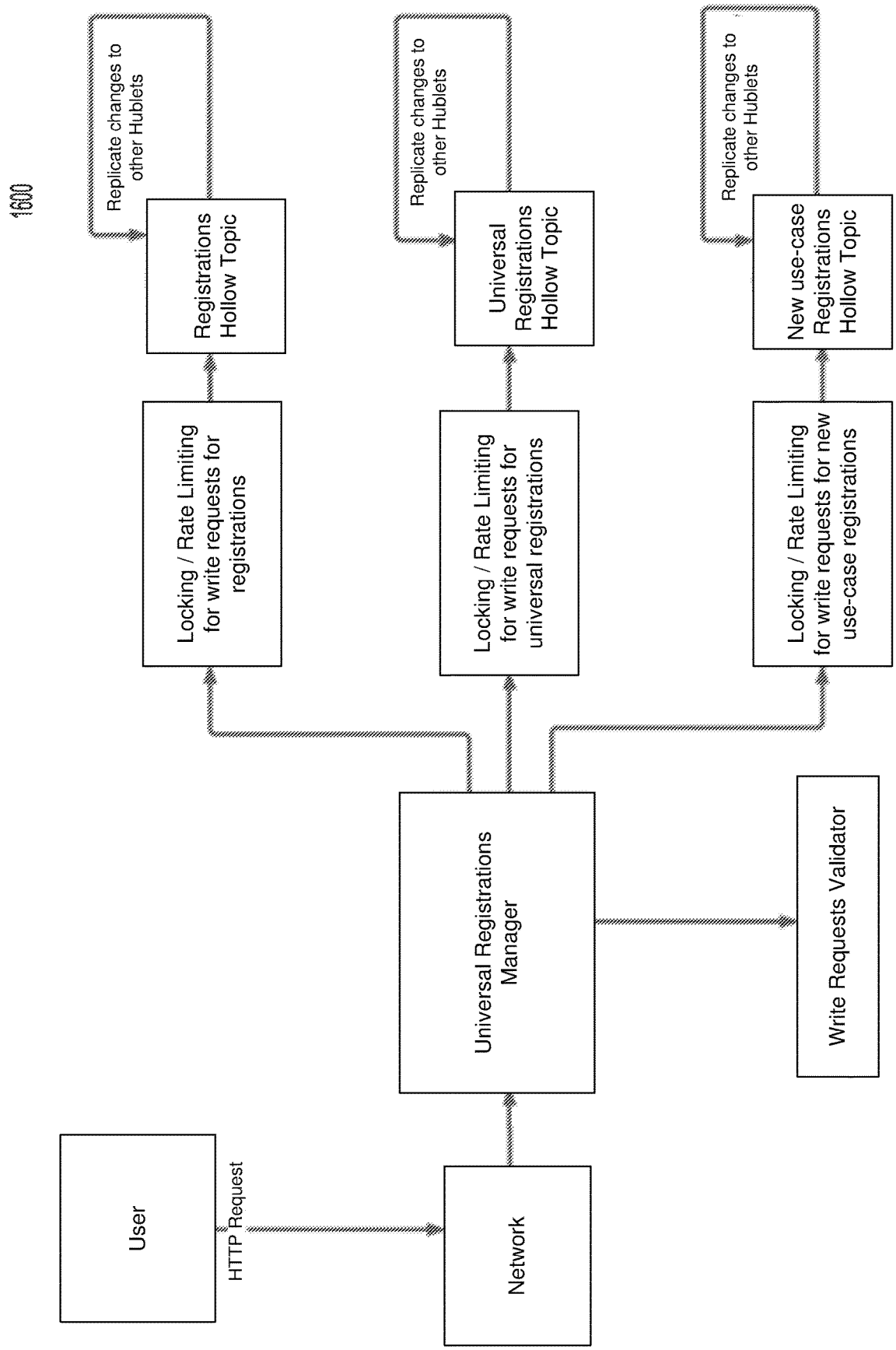
FIG. 16 is an example flow diagram for defining a registration model, according to one or more embodiments of the disclosure.

FIG. 16 is an example flow diagram for defining a registration model, according to one or more embodiments of the disclosure. A user device may submit an HTTP request to a universal registrations manager through a network. The universal registrations manager utilizes a write requests validator to validate write requests. The universal registrations manager performs locking and rate limiting for write requests for calendar registrations associated with a calendar registrations hollow topic where changes are replicated to other hublets. The universal registrations manager performs locking and rate limiting for write requests for universal registrations associated with a universal registrations hollow topic where changes are replicated to other hublets. The universal registrations manager performs locking and rate limiting for write requests for new user-case registrations associated with a new user case registrations hollow topic where changes are replicated to other hublets.

Registration Definition Use Cases

In some embodiments, example applications of registration definition use may include being used with a calendar system (e.g., internal calendar application) and/or a campaign system. As described herein, registration definitions may be used to display scheduling of advertisements on a platform calendar. In some embodiments, these registration definitions may be tied to a payment system (e.g., allowing for payments for events using the payment system or tool).

In some embodiments, use of registration definitions with an analytics system may facilitate determining analytics from CRM activity, such as the number of clicks during an advertisement published on a CRM calendar. In some embodiments, examples may include use of the registration patterns methods and systems described herein to create CRM events such as counting of clicks. The registration definitions may be used with an analytics system to process events for monitoring activities related to the events (e.g., who signed in for an event that the customer is running for their product). Potential touch points may include who is registering, how did they register, what source did they register from, etc. (e.g., relating to signing up for events such as hosting webinars).

There may be other examples for use of registration definitions. In some embodiments, a CRM analytics system may be used to determine, for example, how many times a blog post has been clicked through the use of registration definitions to create CRM blog post click events. Another example use case may include an online university use of course objects with corresponding registration definitions to facilitate integration of the course objects into the calendar system and/or the campaign system. Yet another use case for registration patterns may include use in attribution reporting systems.

One of the potential benefits of registration patterns is that third-parties may not be forced to adhere to a unique standard (e.g., one that may be different than the third-party's standard) when third parties create their own (e.g., custom) objects and use them within the multi-service business platform CRM. This may relate to third-party CRM use/access examples. The methods and systems of registration patterns described herein may provide benefits to third-party CRM use and access. In an example, a customer may define a custom class CRM object that they have been using for a period of time (e.g., one or two years or more). In this example, when the customer finds a vendor (e.g., with a system/service that they want to use with their custom class CRM objects), there is no need for either the customer or the vendor to change their systems—both may keep their objects as they were and the vendor may keep their system in place. If the vendor or the customer uses the example registration pattern methods and systems, interfacing between the customer custom class CRM and the vendor may be done through automatically transforming data without requiring any new code to run. In some embodiments, registration patterns, such as registration definitions may allow for custom object use and creation by third parties. The registration patterns (and supporting CRM access APIs) may be configured with external endpoints through which third parties may access the CRM for their own tools in order to, among other things, visualize custom registration patterns, create new elements or objects, update custom objects in the CRM, etc. Also, a customer may operate an external CRM system and may want to use the systems and processes of registration patterns to map these external CRM objects to objects and/or services of the multi-service business platform CRM. This may be accomplished by defining a set of registration patterns that may facilitate mapping the external CRM object properties to internal CRM object properties and use this set of registration patterns during exchange of data between the systems. In some embodiments, exchange of data between a CRM and external systems may include transforming data based on applied registration patterns (e.g., registration definitions). Transforming may include converting objects (or portions thereof) in the external system to be compatible with objects (or corresponding portions thereof) in the CRM. Registration patterns may also facilitate transforming data for compatibility when transferring CRM objects to the external system.

Through the methods and systems of registration association described herein, a range of CRM-centric capabilities may be enabled. In one example, a metering service may be configured to use registration associations to facilitate monetizing a CRM. Such a metering service may be configured to detect when CRM activity events, such as events by third parties, match a monetizing criteria (e.g., accessing certain fields of certain objects). Based on a CRM access arrangement with the example third party, the metering service may track and count such accesses to form a basis for payment by the third party, etc. In another example, registration associations may be utilized by a CRM analytics service for, among other things, tracking activity within the CRM, such as for maintaining a log of access by specific users, services, etc. Tracking may facilitate analytics pertaining to who is registering/accessing the CRM, what access portal did they use, what source device did they register from, what portion of the CRM are they accessing (e.g., users signing up for events offered through the multi-service business platform), etc. Further, such an analytics system may facilitate adapting allocation to and usage of computing, network, and storage resources for the CRM based on a result of such analysis. If a distal portion of the CRM appears to be accessed frequently by local resources, changes in where the distal portion is stored may occur (e.g., move a highly accessed portion to a storage system that is physically closer to a point of use).

In some embodiments, use of registration associations to monitor CRM activity may cause CRM events, such as analytics that may, for example, increment a "view" counter for a blog post. In some embodiments, if the monitored event identifies that a blog post has been accessed (e.g., retrieved for viewing), the monitoring service that detects this event may update a "view count" field of the blog post object.

Registration associations may also be applied to tracking application activity within a CRM, such as when new assets are on-boarded to a calendar (e.g., when higher education users post new educational class objects that trigger onboarding to the calendar, or when an ad campaign is changed such as a blog posting service requiring access to blog posts registered in the CRM, etc.). Yet further, registration associations may be utilized in attribution reporting systems, etc.

In some embodiments, at least one advantage of the method and systems of registration patterns may include using CRM interactions to allow the CRM records to be used in multiple applications. As an example, without this system and/or process, customers and integrators may need to learn/configure multiple systems in order to gain potentially comparable results. By using the CRM to power this process and/or system, there may be one consistent system, such as the multi-service business platform. Further, using registration patterns in the CRM to configure the CRM-powered application may avoid a need for a second API to interact with multiple applications. Yet further, advantages may include avoiding requiring a two-system approach. Another approach may include flexibility in using registration definitions with third party systems. Clients may keep using their objects with current systems (internal or external with respect to the platform). Also, data may be transformed when transferred into the platform. Yet further advantages may include requiring a reduced set of tasks for achieving a clean bridge between the CRM and the calendar application. Yet further, separation of data related to registration definitions from user to user may provide for unique customizability for users regarding each registration definition and its use. In some embodiments, customers or users may create registration definitions into the CRM via a customer/user portal which may be readily integrated with the platform (e.g., systems, services, features, etc. of the platform). Further, when new applications are developed, existing objects (e.g., core objects and/or custom objects) may be integrated with the new applications via registration definitions with no need to modify the existing objects or develop custom code to accommodate specific object types allowing for the ability to speed up internal development and/or development by integrators.

The methods and systems described herein and depicted in the accompanying figures may present a range of advantages over other approaches. One such advantage may include using objects stored in the CRM (e.g., registration elements) to allow the records in the CRM to be used in multiple applications. Another advantage is that customers/users, integrators, and others may no longer need to learn/configure multiple systems (e.g., their own CRM) to have access to content of the CRM. Thus, a registration pattern-enabled CRM may be embodied as one consistent system that may: (i) use objects in the CRM to configure CRM-powered applications; (ii) avoid need for multiple APIs for interacting with multiple applications; and (iii) avoid constraints of a multi-system approach. Further, users of a multi-service business platform may keep using custom objects stored in the CRM while gaining advantages of CRM-powered (and third-party powered) applications. Third-party systems may use existing interfaces to access the CRM. Clients of the multi-service business platform may utilize existing content creation tools (e.g., tools by which they generate content for the CRM) to generate registration patterns. New applications, projects, services, etc. may be developed, and third-party applications may be integrated into the platform, without requiring substantive development of code, converters, or the like as part of the integration.

In some embodiments, described herein are systems and processes for generating a urchin tracking module (UTM) from a globally unique identifier (GUID), such as one that may be assigned to an object in a database, such as a campaign object in a multi-service business platform customer relationship management (CRM) database. In some embodiments, the urchin tracking module (UTM) is a campaign urchin tracking module (UTM), and the terms are used interchangeably. In some embodiments, described herein are systems and processes for translating a urchin tracking module (UTM) to a globally unique identifier (GUID). In some embodiments, described herein are systems and processes for streamlined access of a campaign source object in a CRM database given at least the UTM or more generally given a uniform resource locator (URL) that may include a UTM.

In some embodiments, a computer-implemented method for generating a tracking module (UTM) to be used in an advertising campaign may include receiving a customer relationship management (CRM) object globally unique identifier (GUID). The method may include instantiating a CRM object in a CRM database. The method may include assigning the GUID to the CRM object. The method may include accessing an indexed name array in the CRM object. The method may include receiving a human generated campaign name (HGCN). The method may further include saving the HGCN as a next indexed entry in the name array. In some embodiments, the method may include encrypting the GUID and a value of the index of the saved HGCN in the name array thereby producing an encrypted(ID V). In some embodiments, the method may include concatenating the HGCN with the encrypted(ID V). In some embodiments, the method may include producing a tracking module (UTM) based on the concatenated HGCN and encrypted(ID, V). Yet further, the method may include using the UTM in an advertising campaign.

In some embodiments, a value of the GUID may be randomly generated using a random number generating facility adapted to avoid producing two identical GUID values over billions of GUID instances. In some embodiments, the CRM object may be encrypted as JavaScript Object Notation (JSON) script. In some embodiments, the HGCN may be saved by adding an auto-indexed entry in the name array. In some embodiments, the index may correspond to a position of the HGCN in the name array. In some embodiments, the encrypting may include advanced encryption standard (AES) type of encryption. In some embodiments, the encrypting may include encrypting a string that includes the GUID followed by a blank character space followed by a value of an index corresponding to the HGCN. In some embodiments, producing the UTM may include assigning the concatenated HGCN with encrypted (ID V) to a "CTM_campaign" attribute of the UTM.

In some embodiments, a computer-implemented method for accessing a customer relationship management (CRM) database object may include receiving a uniform resource locator (URL) with tracking module (UTM) attributes. In some embodiments, this method may further include identifying at least one UTM attribute of the URL. In some embodiments, this method may further include parsing a value of the at least one UTM attribute thereby producing a human-generated campaign (HGCN) and an encrypted object id-version (encrypted(ID V)). In some embodiments, this method may include saving the HGCN. In some embodiments, this method may further include decrypting the encrypted object id-version (ID V) thereby producing an object globally unique identifier (GUID) value and a version value. In some embodiments, this method may further include validating the encrypted object id-version (ID V) based on a cross reference indexed by the version value. In some embodiments, this method may further include securely retrieving an object from the CRM database based on the GUID value. In some embodiments, this method may further include securely retrieving a version-specific HGCN (v-HGCN) from the object by applying the version value as an index into a name array of the object. In some embodiments, this method may further include validating the saved HGCN against the version-specific HGCN. In some embodiments, this method may yet further include granting access by a requestor to contents of the object retrieved from the CRM database conditionally based on the validating.

In some embodiments, identifying at least one UTM attribute of the URL may include identifying a "CTM_campaign" attribute. In some embodiments, decrypting the encrypted(ID V) may include advanced encryption standard (AES) decryption. In some embodiments, securely retrieving the object from the CRM database may include using the GUID as a unique locator of the object in a distributed database. In some embodiments, validating the saved HGCN against the v-HGCN may include comparing the saved HGCN to the v-HGCN. In some embodiments, granting access may be in response to a successful validating of the saved HGCN against the v-HGCN. In some embodiments, granting access may occur responsive to the securely retrieving of an object from the CRM for an authorized requestor.

In some embodiments, a system may include a campaign UTM to GUID and validation system substantially as shown and described.

In some embodiments, a method may include a method for translating a campaign UTM to a GUID as shown and described.

In some embodiments, a computer-implemented method may include a computer-implemented method substantially as hereinbefore described with reference to any of the examples and/or to any of the accompanying drawings.

In some embodiments, a computing system may include a computing system including one or more processors and one or more memories configured to perform operations substantially as hereinbefore described with reference to any of the examples and/or to any of the accompanying drawings.

In some embodiments, a computer program product may include a computer program product residing on a computer readable storage medium having a plurality of instructions stored thereon which, when executed across one or more processors, causes at least a portion of the one or more processors to perform operations substantially as hereinbefore described with reference to any of the examples and/or to any of the accompanying drawings.

In some embodiments, a device may include a device configured substantially as hereinbefore described with reference to any of the examples and/or to any of the accompanying drawings.

In some embodiments, a method of using registration definitions in a customer relationship management (CRM)-powered application may include accessing a registration patterns data structure that includes a set of registration definition element instances. Each registration definition element instance may be associated with a type of object present in a database. The method may further include accessing at least one occurrence of the type of object from the database. Yet further, the method may include adapting a value of at least one property in the at least one occurrence based on a mapping of the at least one property to a content item of the CRM-powered application. The mapping may be described in the registration definition element instance. Also, the method may include delivering the adapted value to the CRM-powered application as the content item.

In some embodiments, accessing the registration patterns data structure may be based on a correspondence of an application identifier in the registration patterns data structure to an identifier of the CRM-powered application. In some embodiments, the registration patterns data structure may be stored in the database. In some embodiments, the CRM-powered application may include a calendar application that may depict items in a calendar-based user interface based on date information in the content item. In some embodiments, the at least one occurrence of the type of object may be for an event and the at least one property may be a date of the event. In some embodiments, adapting may cause the date of the event to be mapped to a content item, thereby triggering the calendar application to depict the event on the date of the event.

In some embodiments, a method of using registration association for maintaining consistency in a customer relationship management (CRM) database may include monitoring a stream of CRM change activity that includes change events each identifying an object type and a property change. The method may further include matching the object type in each change event to a list of registration associations. In some embodiments, the list of registration associations may include registration association element instances each identifying a target object type and a monitored property. In some embodiments, the method may further include propagating the property change to a corresponding property of at least one other object of the target object type stored in the CRM. In some embodiments, the propagating may be based on a correspondence of the object type in the change event to the target object type and a correspondence of the property in the change event to the monitored property. In some embodiments, propagating the property change may be based on an association cardinality property of a registration instance. In some embodiments, a one-to-many cardinality property value of the association cardinality property may result in adding a value that may be identified in the property change of the change event to the corresponding property. In some embodiments, a one-to-one cardinality property value of the association cardinality property may result in replacing an existing value in the corresponding property with a value that may be identified in the property change of the change event.

In some embodiments, a system may include a registration system substantially as shown and described.

In some embodiments, a method may include a method for creating and/or using a registration pattern, a registration association, or a registration definition as shown and described.

In some embodiments, a method may include a computer-implemented method substantially as hereinbefore described with reference to any of the examples and/or to any of the accompanying drawings.

In some embodiments, a system may include a computing system including one or more processors and one or more memories configured to perform operations substantially as hereinbefore described with reference to any of the examples and/or to any of the accompanying drawings.

In some embodiments, a computer program product may include a computer program product residing on a computer readable storage medium having a plurality of instructions stored thereon which, when executed across one or more processors, causes at least a portion of the one or more processors to perform operations substantially as hereinbefore described with reference to any of the examples and/or to any of the accompanying drawings.

In some embodiments, a device may include a device configured substantially as hereinbefore described with reference to any of the examples and/or to any of the accompanying drawings.

What is claimed is:

1. A method, comprising:
   assigning a globally unique identifier to a customer relationship management (CRM) object within a CRM database;
   saving a generated tracking module name as an entry in an array within the customer relationship management object;
   creating encrypted information comprising an encryption of the globally unique identifier and a value of the entry storing the generated tracking module name;
   creating concatenated information comprising the generated tracking module name concatenated with the encrypted information;
   parsing a uniform resource locator (URL) received from an application to obtain the generated tracking module name and the encrypted information;
   decrypting the encrypted information a number of times corresponding to a number of versions of the generated tracking module name to obtain an object identifier value and a version value for the CRM object within the CRM database;
   utilizing the version value as an index into an encrypted portion validation table of the CRM database to validate whether the encrypted information matches a corresponding value in the encrypted portion validation table;
   in response to validating the encrypted information, using the object identifier value to provide access to the CRM object within the CRM database; and
   in response to unsuccessfully validating the encrypted information, executing a security action to halt a process associated with the application.

2. The method of claim 1, comprising:
   generating the globally unique identifier using a random number generator configured to generate non-identical globally unique identifiers over a set of globally unique identifiers.

3. The method of claim 1, wherein electronic content is selected and provided to users and describes a service provided by a customer of a multi-service business platform that includes the CRM database, and wherein an urchin tracking module uses the concatenated information to track interactions of the users with the electronic content for providing insight to the customer of user interest with the service.

4. The method of claim 1, wherein the saving comprises:
   adding an auto-indexed entry as the entry into the array, wherein the auto-indexed entry corresponds to a position of the generated tracking module name within the array.

5. The method of claim 1, wherein the concatenated information comprises a concatenated generated tracking module name and the encrypted information, and wherein the generating comprises:
   assigning the concatenated generated tracking module name and the encrypted information to an urchin tracking module attribute of an urchin tracking module.

6. The method of claim 1, comprising:
   receiving the URL with an urchin tracking module attribute that is used to create the generated tracking module name.

7. The method of claim 1, comprising:
   receiving the URL with urchin tracking module attributes used to obtain an attribute value for generating an encrypted object id-version as the encrypted information.

8. A computing device comprising:
   a memory comprising machine executable code; and
   a processor coupled to the memory, the processor configured to execute the machine executable code to cause the processor to perform operations comprising:
      assigning a globally unique identifier to a customer relationship management (CRM) object within a CRM database;
      saving a generated tracking module name as an entry in an array within the customer relationship management object;
      creating encrypted information comprising an encryption of the globally unique identifier and a value of the entry storing the generated tracking module name;
      creating concatenated information comprising the generated campaign tracking module name concatenated with the encrypted information;
      parsing a uniform resource locator (URL) received from an application to obtain the generated tracking module name and the encrypted information;
      decrypting the encrypted information a number of times corresponding to a number of versions of the generated tracking module name to obtain an object identifier value and a version value for the CRM object within the CRM database;
      utilizing the version value as an index into an encrypted portion validation table of the CRM database to validate whether the encrypted information matches a corresponding value in the encrypted portion validation table;

in response to validating the encrypted information, using the object identifier value to provide access to the CRM object within the CRM database; and in response to unsuccessfully validating the encrypted information, executing a security action to halt a process associated with the application.

9. The computing device of claim 8, wherein the operations comprise:

generating the globally unique identifier using a random number generator configured to generate non-identical globally unique identifiers over a set of globally unique identifiers.

10. The computing device of claim 8, wherein electronic content is selected and provided to users and describes a service provided by a customer of a multi-service business platform that includes the CRM database, and wherein an urchin tracking module uses the concatenated information to track interactions of the users with the electronic content for providing insight of user interest with the service.

11. The computing device of claim 8, wherein the saving comprises:

adding an auto-indexed entry as the entry into the array, wherein the auto-indexed entry corresponds to a position of the generated tracking module name within the array.

12. The computing device of claim 8, wherein the concatenated information comprises a concatenated generated tracking module name and the encrypted information, and wherein the generating comprises:

assigning the concatenated generated tracking module name and the encrypted information to an urchin tracking module attribute of an urchin tracking module.

13. The computing device of claim 8, wherein the operations comprise:

receiving the URL with an urchin tracking module attribute that is used to create the generated tracking module name.

14. The computing device of claim 8, wherein the operations comprise:

receiving the URL with urchin tracking module attributes used to obtain an attribute value for generating an encrypted object id-version as the encrypted information.

15. A non-transitory machine readable medium comprising instructions for performing a method, which when executed by a machine, causes the machine to perform operations comprising:

assigning a globally unique identifier to a customer relationship management (CRM) object within a CRM database;

saving a generated tracking module name as an entry in an array within the customer relationship management object;

creating encrypted information comprising an encryption of the globally unique identifier and a value of the entry storing the generated tracking module name;

creating concatenated information comprising the generated tracking module name concatenated with the encrypted information;

parsing a uniform resource locator (URL) received from an application to obtain the generated tracking module name and the encrypted information;

decrypting the encrypted information a number of times corresponding to a number of versions of the generated tracking module name to obtain an object identifier value and a version value for the CRM object within the CRM database;

utilizing the version value as an index into an encrypted portion validation table of the CRM database to validate whether the encrypted information matches a corresponding value in the encrypted portion validation table;

in response to validating the encrypted information, using the object identifier value to provide access to the CRM object within the CRM database; and in response to unsuccessfully validating the encrypted information, executing a security action to halt a process associated with the application.

16. The non-transitory machine readable medium of claim 15, wherein the operations comprise:

generating the globally unique identifier using a random number generator configured to generate non-identical globally unique identifiers over a set of globally unique identifiers.

17. The non-transitory machine readable medium of claim 15, wherein electronic content is selected and provided to users and describes a service provided by a customer of a multi-service business platform that includes the CRM database, and wherein an urchin tracking module uses the concatenated information to track interactions of the users with the electronic content for providing insight of user interest with the service.

18. The non-transitory machine readable medium of claim 15, wherein the saving comprises:

adding an auto-indexed entry as the entry into the array, wherein the auto-indexed entry corresponds to a position of the generated tracking module name within the array.

19. The non-transitory machine readable medium of claim 15, wherein the concatenated information comprises a concatenated generated tracking module name and the encrypted information, and wherein the generating comprises:

assigning the concatenated generated tracking module name and the encrypted information to an urchin tracking module attribute of an urchin tracking module.

20. The non-transitory machine readable medium of claim 15, wherein the operations comprise:

receiving the URL with an urchin tracking module attribute that is used to create the generated tracking module name.

* * * * *